United States Patent [19]

Snow

[11] 4,428,349

[45] Jan. 31, 1984

[54] IGNITION AND FUEL CONTROL SYSTEM FOR INTERNAL COMBUSTION ENGINES

[76] Inventor: Thomas K. Snow, 1499 Lancaster Ave., Reynoldsburg, Ohio 43068

[21] Appl. No.: 268,093

[22] Filed: May 27, 1981

Related U.S. Application Data

[63] Continuation-in-part of Ser. No. 39,784, May 17, 1979, abandoned.

[51] Int. Cl.³ .............................................. F02B 3/00
[52] U.S. Cl. ................................... 123/493; 123/399;
123/350; 123/477; 123/613; 123/643; 123/492;
123/637; 123/487; 123/336
[58] Field of Search ................ 123/492, 493, 643, 637,
123/638, 472, 478, 486, 487

[56] References Cited

U.S. PATENT DOCUMENTS

| | | | |
|---|---|---|---|
| 3,418,989 | 12/1968 | Silverman | 123/643 |
| 3,621,826 | 11/1971 | Chrestensen | 123/643 |
| 3,661,126 | 5/1972 | Baxendale | 123/492 |
| 3,673,989 | 7/1972 | Aono | 123/492 |
| 3,749,070 | 7/1973 | Oishi | 123/492 |
| 3,858,561 | 1/1975 | Aono | 123/492 |
| 3,898,962 | 8/1975 | Honig | 123/492 |
| 3,976,043 | 8/1976 | Canup | 123/637 |
| 4,002,152 | 1/1977 | Hoshi | 123/492 |
| 4,112,879 | 9/1978 | Assenheimer | 123/492 |
| 4,112,890 | 9/1978 | Manger | 123/637 |
| 4,112,895 | 9/1978 | Habert | 123/643 |
| 4,116,169 | 9/1978 | Krupp | 123/492 |
| 4,194,480 | 3/1980 | Rado | 123/643 |
| 4,208,992 | 6/1980 | Polo | 123/643 |
| 4,269,152 | 5/1981 | Van Siclen | 123/643 |
| 4,335,694 | 6/1982 | Mausner | 123/478 |
| 4,359,037 | 11/1982 | Stangl | 123/643 |

*Primary Examiner*—Ronald B. Cox
*Attorney, Agent, or Firm*—Robert E. Stebens

[57] ABSTRACT

An electronic ignition and fuel control system is provided for internal combustion automotive vehicle engines which are of the spark ignition type. The ignition and fuel control system of this invention includes an electronic timing and detector circuit, distributor circuit, clock and command circuit, ignition power circuit and air-fuel control circuit. The clock and command circuit responds to selected positioning of an accelerator control element to provide either a plurality of firing pulses to the engine ignitors in an acceleration mode of operation, or to provide single pulse firing in the case of steady state operation or a deceleration mode of operation. In the ignition and power circuit, individual coils are provided for generating a high voltage firing pulse applied to each of the ignitors that are interconnected with the respective coil. Control of the air-fuel mixture provided to the engine cylinders is achieved through a device having a fuel valve that is electronically controlled in accordance with the outputs from the clock and command circuit as determined by the particular mode of operation and to also control air flow to the engine.

23 Claims, 22 Drawing Figures

IGNITION AND FUEL CONTROL SYSTEM FOR INTERNAL COMBUSTION ENGINES

This application is a continuation-in-part of Application Ser. No. 39,784 filed May 17, 1979 now abandoned.

FIELD OF THE INVENTION

This invention relates in general to an electronic ignition and fuel control system specifically adapted to internal combustion engines. The system of this invention is particularly adaptable to internal combusion engines whether of the spark or other type ignition producing means for initiating combustion of a fuel-air mixture.

BACKGROUND OF THE INVENTION

There have been numerous attempts to provide improved and enhanced ignition systems for internal combustion engines. These prior systems have, in particular, been designed for the ignition spark type engines and include various types of electronic circuits for effecting control over the ignition as well as to provide enhanced ignition power. Some of the previously known circuits have attempted to enhance ignition of the fuel air mixture through forming multiple firing pulses at an ignitor for a particular engine cylinder. An example of such a system is shown in U.S. Pat. No. 3,394,690 granted to L. W. Bell on July 30, 1968. That illustrative system includes circuitry designed to produce a series of firing pulses that are applied to the ignitors or spark plugs. The objective is to provide multiple pulse firing comprising a sequential series of ignition sparks occurring at predetermined spaced times during the firing or ignition stroke to better assure that the fuel-air mixture is ignited to achieve more efficient use of fuel than could be expected to be achieved through the use of an ignitor providing only a single spark at the predetermined ignition time. Such multiple pulse firing is particularly advantageous when the engine is in an acceleration mode of operation.

Another attempt to enhance performance of internal combustion engines has been the providing of individual spark ignition coils for each of the cylinder ignitor devices. Examples of such attempts are disclosed in U.S. Pat. No. 3,993,035 granted to M. E. Gerry on Nov. 23, 1976 and U.S. Pat. No. 3,886,923 granted to the same inventor on June 3, 1975.

A different approach in attempting to obtain enhanced ignition of the fuel-air mixture within the cylinder has been attempted through modification of the electric firing pulse to achieve improved ignition of the fuel-air mixture by extending the duration of ignition spark. An example of this type of approach is illustrated in U.S. Pat. No. 3,939,814 granted to R. E. Bergstresser on Feb. 24, 1976.

Other known electronic ignition systems that have been devised are directed to systems which substitute electronic circuitry for the older and more frequently utilized mechanical apparatus for effecting the ignition. The general objective of these circuits is to merely eliminate the mechanical malfunctions that could otherwise be expected utilizing mechanically operated apparatus components. While the electronics technology enables achievement of this objective, such circuits have become relatively complex in attempting to incorporate sophisticated circuitry capable of compensating for advancement or retarding of the firing point as well as also determining the time of firing.

In general, the previously devised electronic systems for internal combustion engine firing have been directed to circuitry incorporated in apparatus of a type that is generally intended to be substituted for the apparatus previously utilized and employing mechanically actuated components. These systems, by and large, have not provided any distinct change in the mode of operation of providing the firing pulses although the substitution of the electronic circuits for the mechanical components has been effective in eliminating the mechanical malfunctions that were previously frequently experienced.

SUMMARY OF THE INVENTION

An electronic ignition and fuel control system is provided by this invention to enhance the operational performance of internal combustion engines, automotive vehicle engines, for example, utilizing ignition devices such as spark plugs for initiating burning of a fuel air mixture in the cylinders. While automotive vehicle engines perhaps comprise the largest number of such engines to which the ignition and fuel control system of this invention may be advantageously adapted, it will be understood that other engines may also utilize the invention. One other specific type of engine considered to have a need for this invention is the reciprocating type engine still used on many aircraft.

The ignition and fuel control system of this invention differs from the known electronic ignition systems in the important aspect that it is designed to sense the difference between operation of the vehicle in an acceleration mode as contrasted as to either a deceleration or steady state mode of operation and to control the providing of firing pulses to the respective ignition devices in accordance with those modes of operation. An important objective in doing so is to further enhance the burning of the fuel-air mixture and thereby effect greater efficiency in engine operation as well as to substantially and materially improve an engine's performance characteristics. In an acceleration mode of operation, it is extremely important that an adequate ignition spark be provided during the course of burning of the fuel-air mixture charge that is drawn into a particular cylinder. In accordance with this invention, those objectives are readily accomplished through the providing of circuitry and control functions to produce multiple ignition pulses of a controlled variable number during a firing portion of the engine cycle for each of the respective cylinders. For deceleration and steady state modes of operation, the system is sensitive to and is capable of distinguishing such operating modes to produce related control inputs. Since the need and requirement for multiple or a variably controlled number of firing pulses is not as essential in decelerating or steady state operating modes, an engine can rely entirely on a single firing pulse for achieving combustion of the fuel-air mixture and the system of this invention automatically functions to provide only a single firing pulse to the engine's ignition devices.

The ignition and fuel control system, as provided by this invention, includes an electronic timing-detector circuit which senses and relates the functional operation of the other components of the apparatus to the rotational position of the engine and the proper firing order of the several cylinders of that engine. An electronic distributor circuit is provided to respond to the control voltage pulses produced in direct proportional relationship to the rotation of the engine and effect application of firing pulses to the respective ignition devices of the engine in the proper firing order. Operating state detection circuitry is incorporated to assure that operation will only be initiated when the proper signals are generated by the timing-detector circuit. To further enhance the operation and enable the system to provide multiple firing pulses during an acceleration mode of operation, an ignition and power circuit is provided that has individual ignition coils for each respective ignition device and its associated cylinder that receive an input in accordance with the firing order and the timing of the engine for optimum performance. Utilization of separate and independently operable ignition coils enables the apparatus to provide the multiple pulse firing as the duty time and cycle of any particular ignition coil is substantially reduced to the point where the system may be economically fabricated and made commercially feasible through use of lower cost components than would otherwise be necessary to handle multiple pulse firing.

Control of the system, as between the acceleration, deceleration and steady state modes of operation, is effected by a command and control circuit which also produces the high frequency pulse rate for obtaining the multiple firing pulses as determined necessary in accordance with the mode of operation. This control and command circuit includes an input-signal generating means which, in one embodiment of the system eliminates the mechanical interconnection as between a foot-operated acceleration control element and a fuel-air dispensing device and relies primarily upon electrical interconnection and signals to provide the necessary control functions. In another embodiment of the system, additional control inputs are provided to enable operation of a fuel-air dispensing device without mechanical interconnection to an operator controlled element such as a foot-operated accelerator pedal. A unit closely simulating functional operation of an accelerator pedal is provided to produce an analog voltage signal proportional to the selective positioning of the accelerator pedal and this analog signal is then converted to a digital signal for operation of the components of the system. The output of the command and control circuit is not only responsive to the operating condition of the engine at any particular instance, but it is also capable of integrally incorporating that signal with the input control function of the accelerator element to properly control and meter fuel flow and air flow into the engine by the fuel air dispensing device.

These and other objects and advantages of this invention will be readily apparent from the following detailed description of illustrative embodiments thereof and the accompanying drawings.

DESCRIPTION OF THE DRAWING FIGURES

FIGS. 7A-D are time voltage graphs illustrating the functioning of the operating state circuit.

Figure 8:
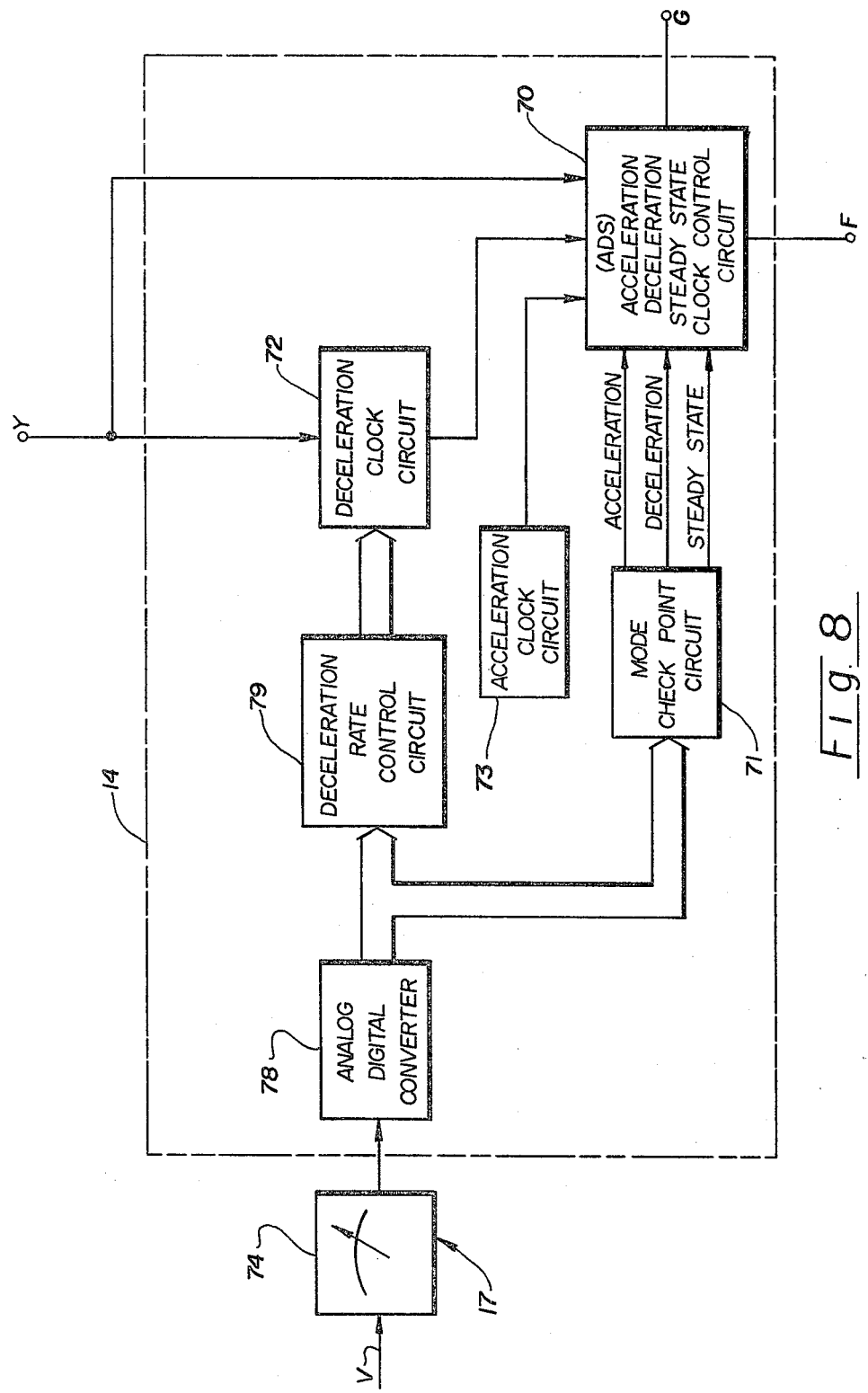

FIG. 8 is a block diagram of the clock and command circuit.

Figure 9:
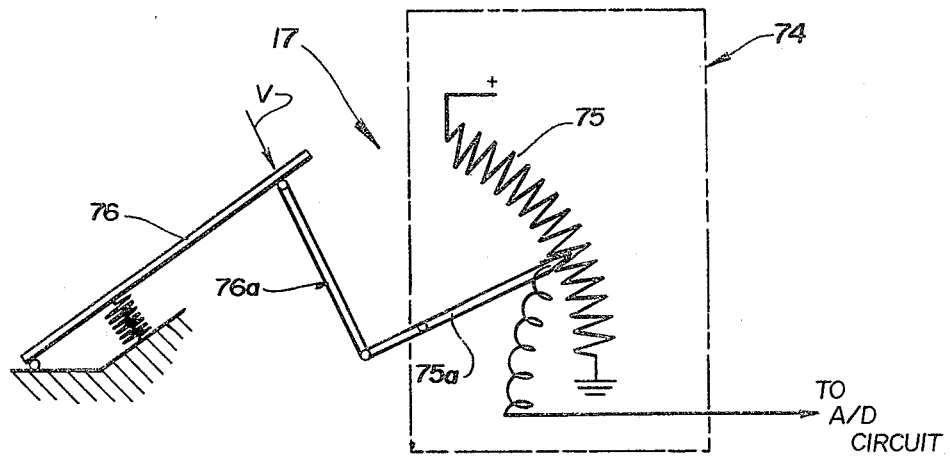

FIG. 9 is a diagrammatic illustration of the acceleration control pedal device.

Figure 10:
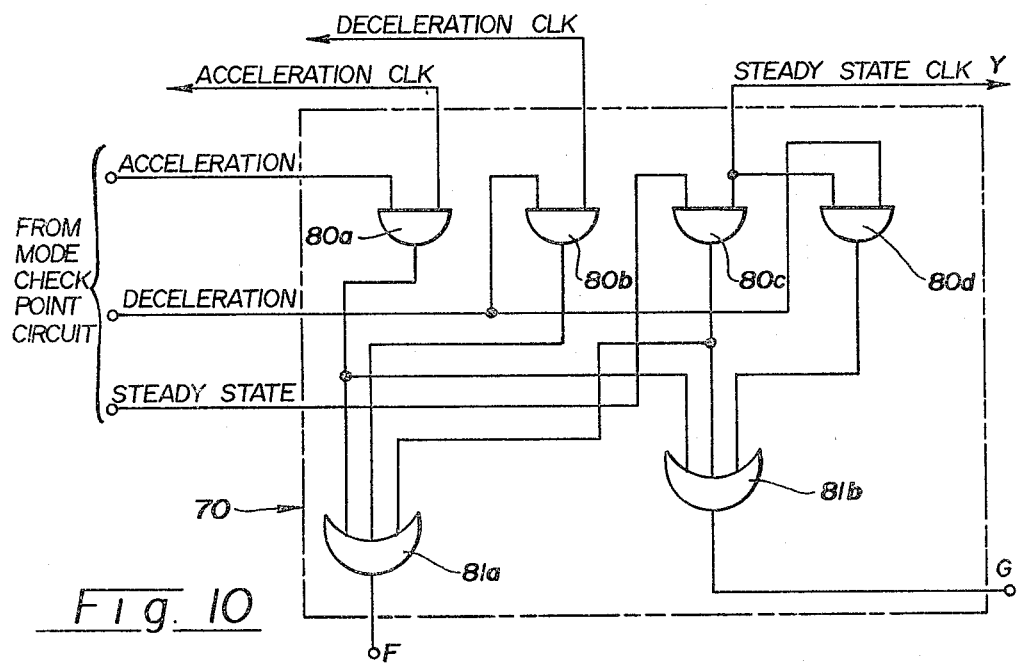

FIG. 10 is a diagram of the acceleration/deceleration/steady state clock control circuit illustrating in detail a logic circuit therefor.

Figure 11:
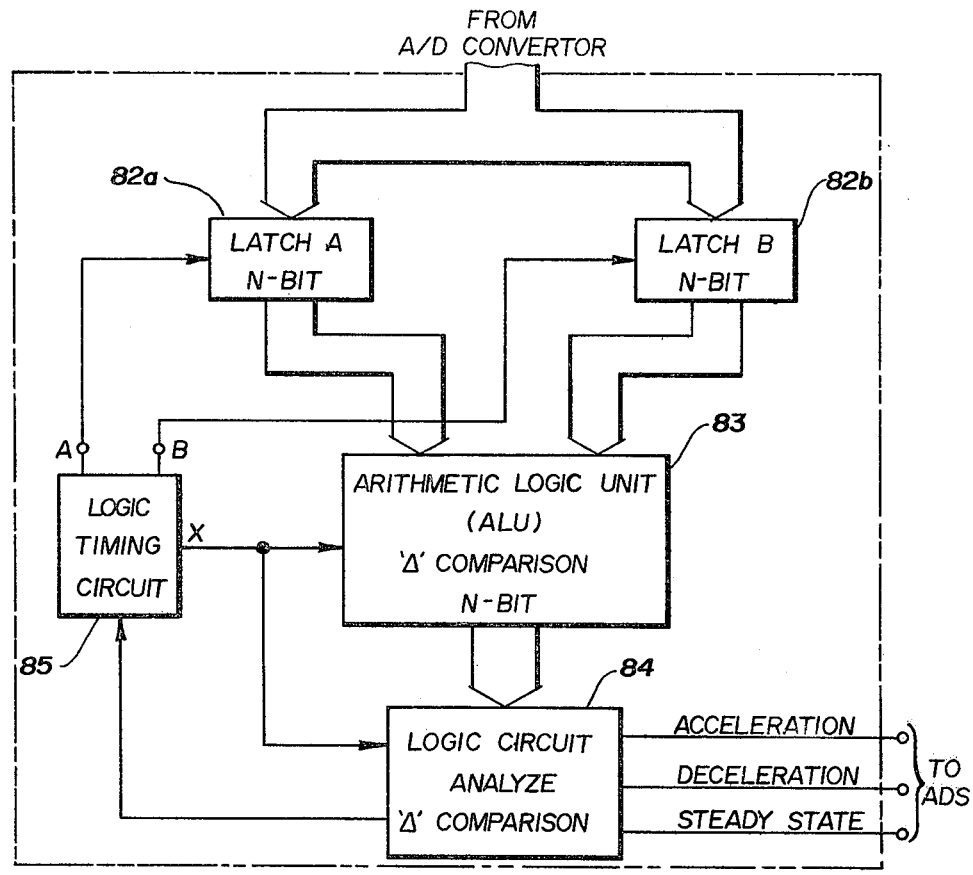

FIG. 11 is a diagram of the mode check point circuit illustrating in detail a circuit therefor.

Figure 12:
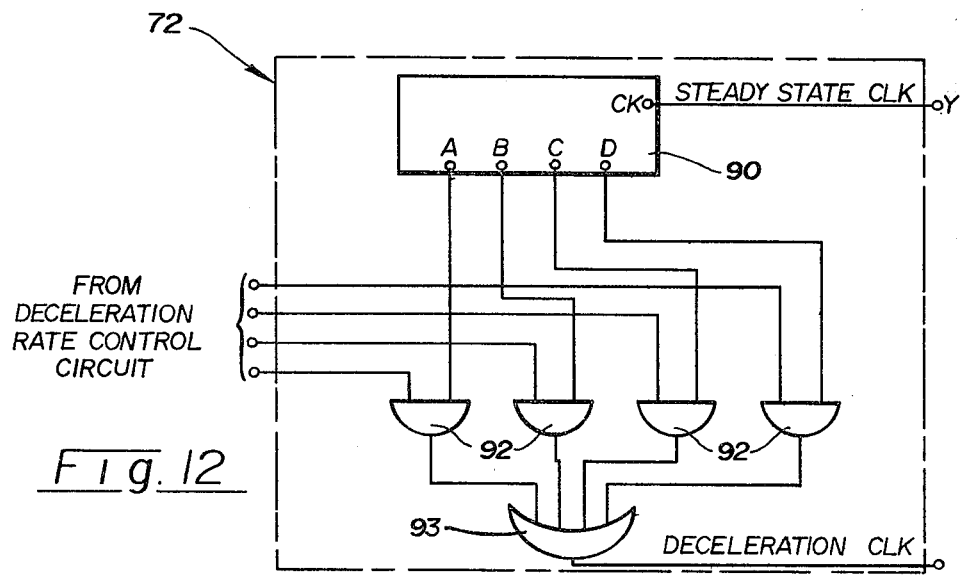

FIG. 12 is a diagram of the deceleration clock circuit illustrating in detail a circuit therefor.

Figure 13:
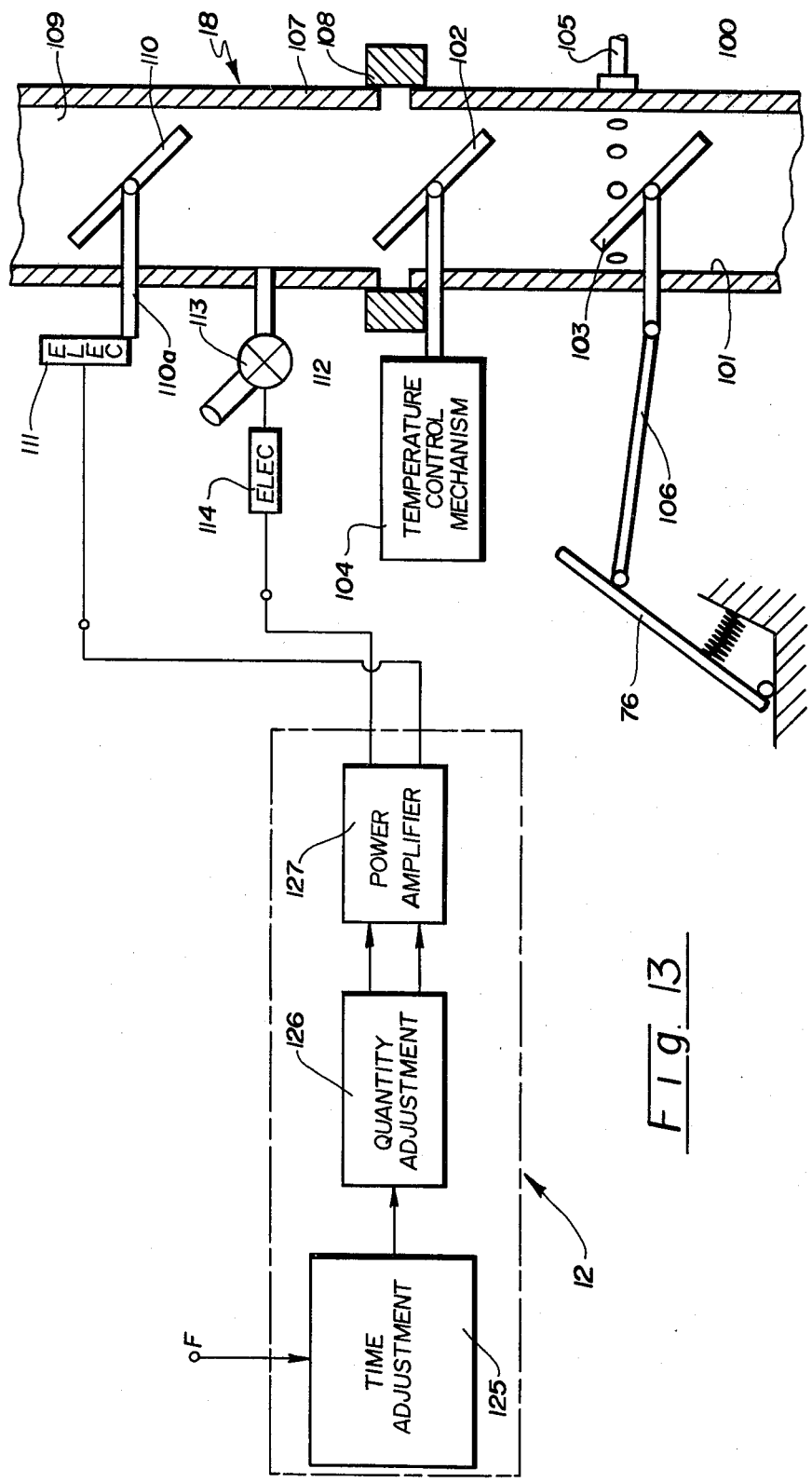

FIG. 13 is a diagrammatic illustration of an air-fuel control device and a block diagram of a control circuit therefor.

Figure 14:
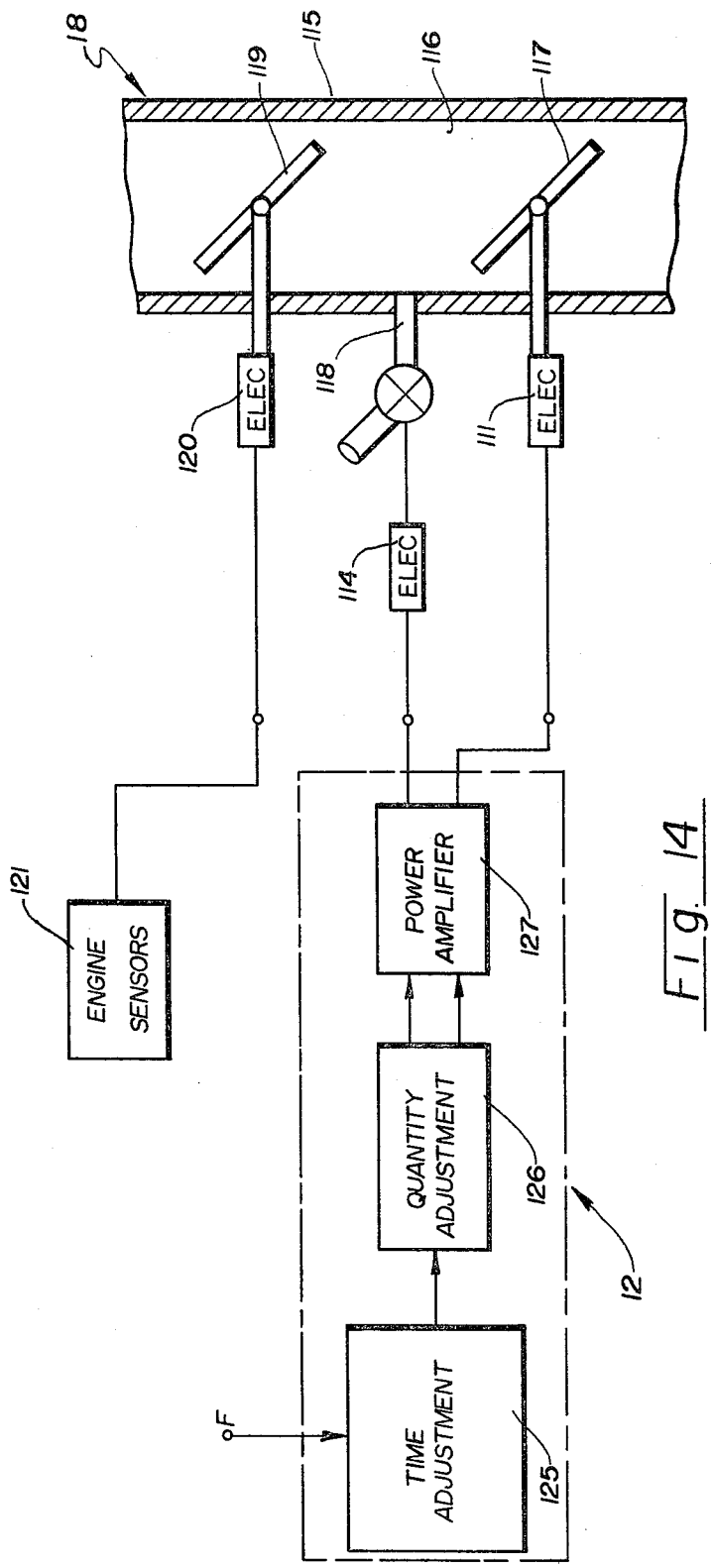

FIG. 14 is a diagrammatic illustration of a modified air-fuel control device and a block diagram of a control circuit therefor.

Figure 15:
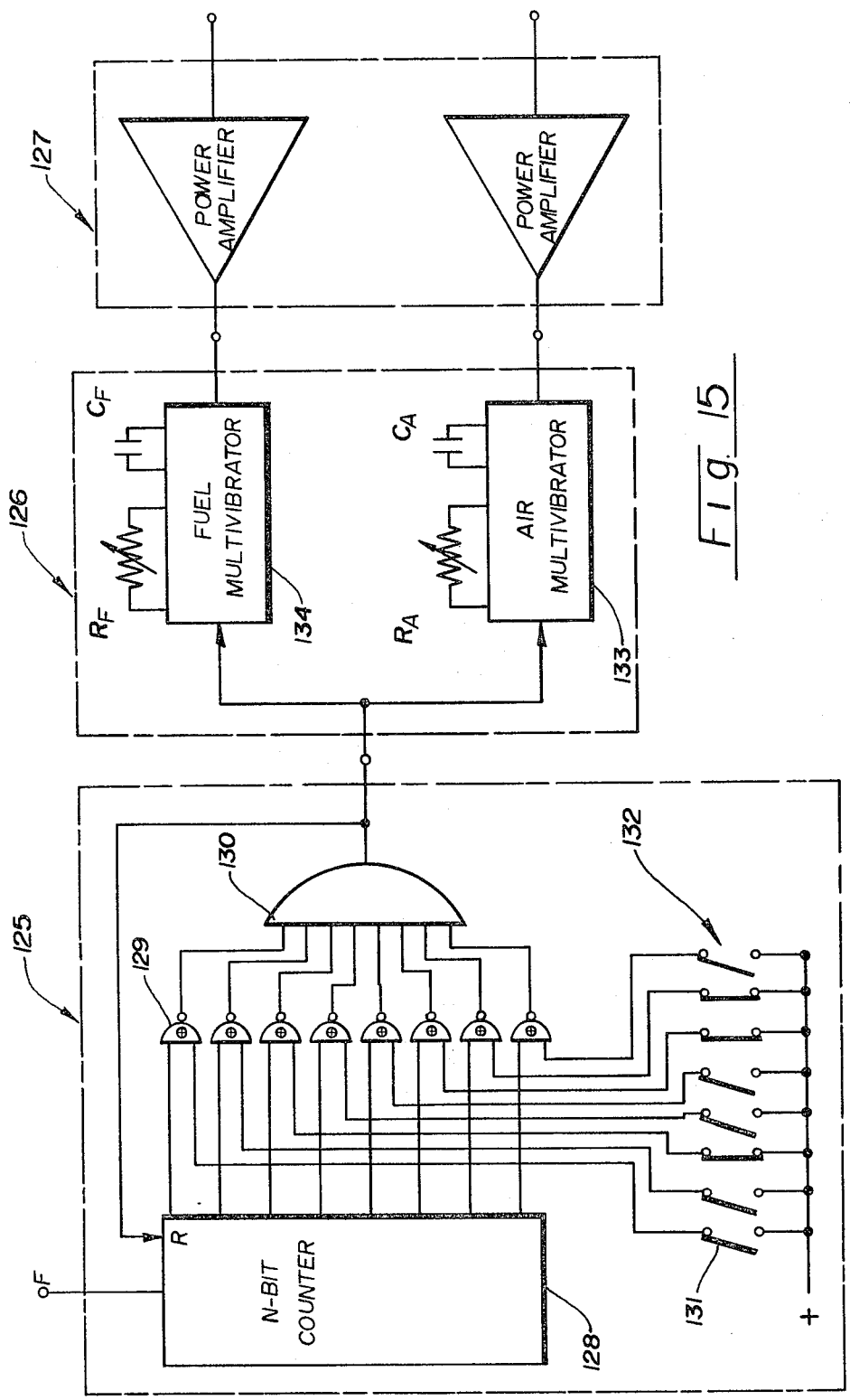
Figure 16:
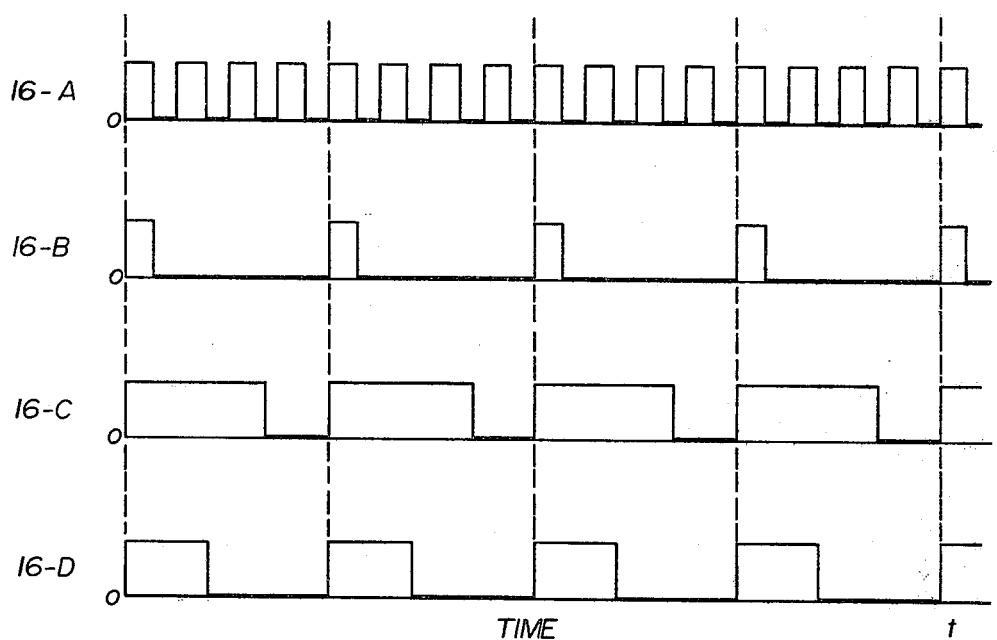

FIG. 15 is a diagram of the time and quantity adjustment circuits illustrating in detail circuits therefor.

FIG. 16A-D are time-voltage graphs for the quantity adjustment circuit showing typical signals generated thereby.

Figure 17:
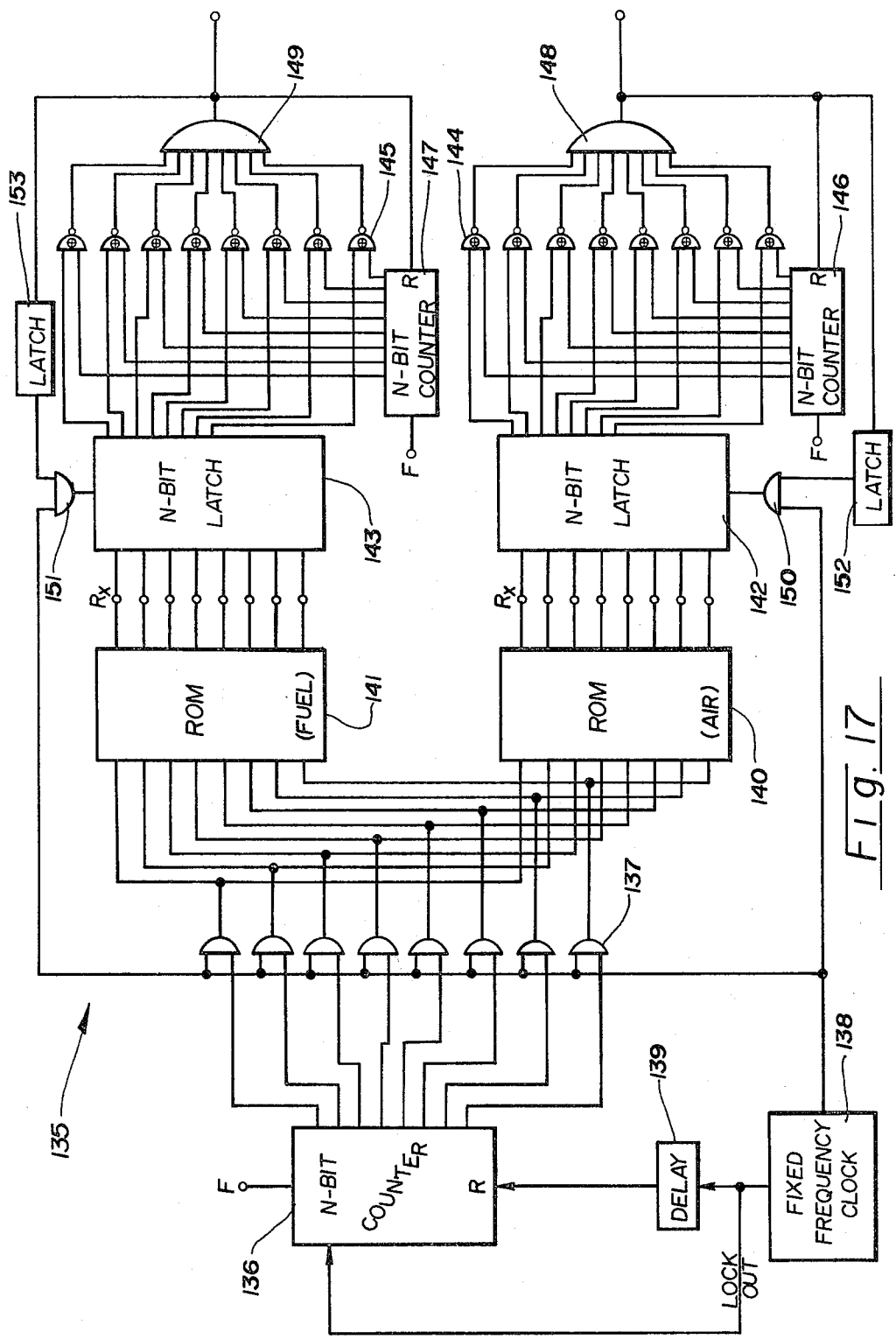

FIG. 17 is a diagram of a modified time adjustment circuit illustrating in detail a non-linear circuit.

DESCRIPTION OF THE ILLUSTRATIVE EMBODIMENT

Figure 1:
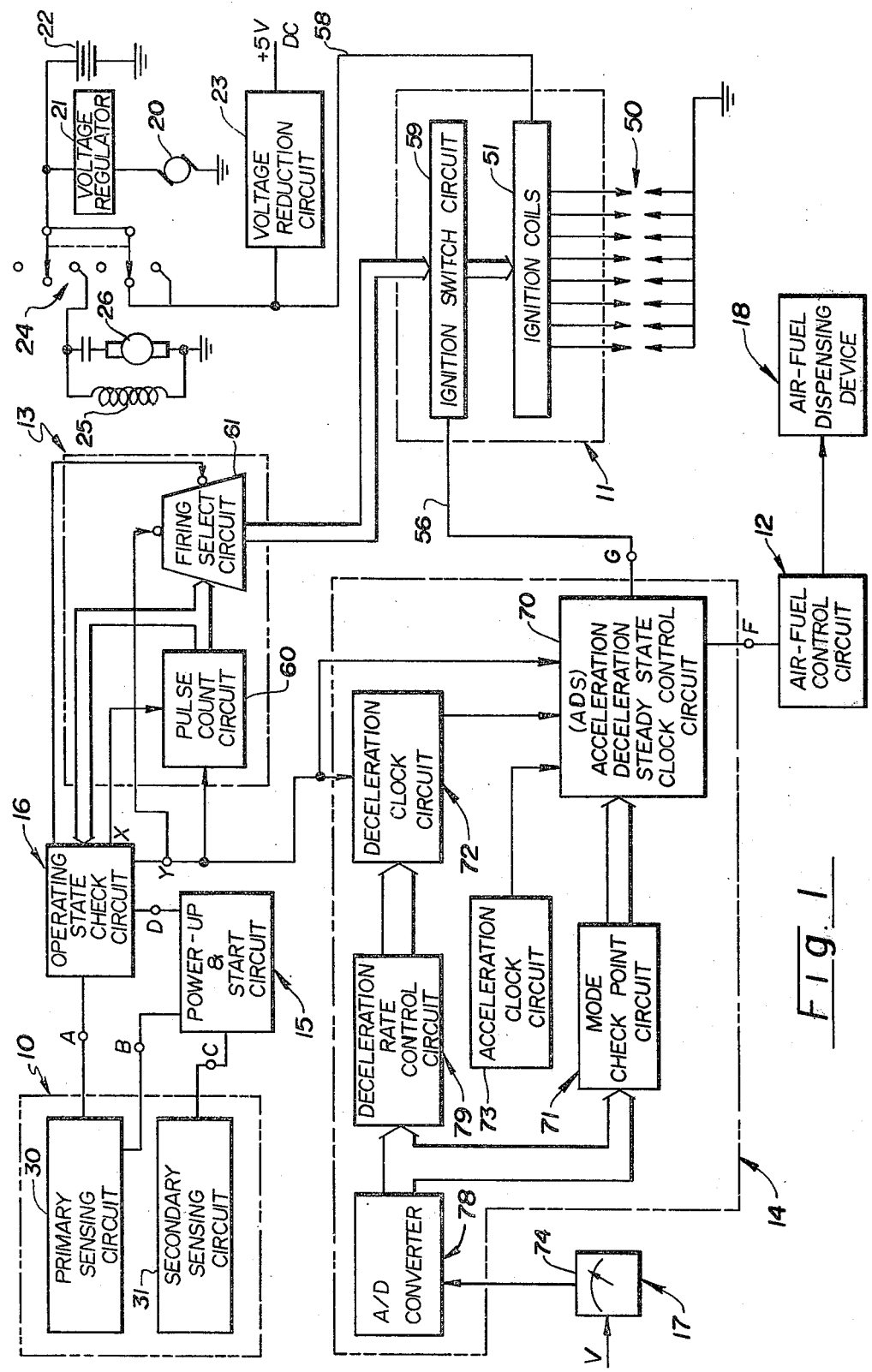
FIG. 1 is a block diagram of an ignition and fuel control system embodying this invention.

Having reference to the drawings and specifically to FIG. 1 thereof, it will be seen that a block diagram illustration is provided of an ignition and fuel control system embodying this invention and adapted for utilization with an internal combustion engine. The specific illustrative circuit is indicated to be adapted to an engine having eight cylinders with each cylinder being provided with a respective ignition device. Also, the system that is illustrated is of a type designed to provide a combined fuel-air mixture to the engine cylinders for combustion therein. This specific illustrative application is not considered to be limitative on the disclosure in that the fuel and air may be separately provided at respective ports to each of the engine cylinders through appropriate mechanisms and structural devices. Accordingly, the explanation of the invention will be appropriate as to either type of fuel dispensing system. It will be further noted that the illustrative system provides for essentially complete control by signals provided from a sensing input responsive to the rotational movement of the engine and a manual control device which is simulative of a conventional foot-operated accelerator pedal and is actuated by the vehicle operator. In response to such input signals, the system effects control as to the firing of the engine ignition devices and the dispensing of the proper air-fuel mixture.

The system, as illustrated, can be best described in its basic sub-parts or components which, for convenience, are designated as follows:

1. timing detector circuit 10,
2. ignition power circuit 11,
3. air fuel control circuit 12,
4. distributor circuit 13,
5. clock and command circuit 14,
6. power-up and start circuit 15,
7. operating state check circuit 16,
8. accelerator input control 17, and 9. air fuel dispensing device 18.

Additionally, it will be understood that a suitable electrical power source is provided for operation for the various components and devices. In an electronic system of the illustrative type which is particularly adapted to utilization of solid state electronic components, the system power may be of a relatively low voltage type. Additional electrical power requirements can be met as required by conventionally available electrical power sources to enable operation of the components such as the ignition devices associated with the engine and the electromechanical actuators of the air-fuel dispensing device.

Operation of the various components is briefly summarized at this point to provide a better basis for understanding the specifics of each of the several components. Initiation and primary control of the system is obtained through the detection and sensing of the particular rotative position of the engine with that information being obtained through a mechanism similar to a conventional distributor. However, in this system that mechanism is designed to merely provide two independent input signals to the system which are associated with the respective point of firing of each individual cylinder as well as initiating a firing sequence for each of the ignition devices in the designated firing order. This initial timing operation is obtained by the timing detector circuit 10 and the output thereof is routed through the power-up and start circuit 15 and the operating state check circuit 16. The function of these circuits 15 and 16 is to detect and sense the beginning of a firing sequence and to apply a proper voltage signal to the distributor circuit 13 as well as to the clock and command circuit 14. Functioning of the distributor circuit is such that firing signals as they are received will effect sequential operation of that system to apply control signals to the ignition power circuit 11. Upon receipt in the ignition power circuit 11, those signals are effectively operable in enabling the generation of electrical firing pulses that are applied to the respective ignition devices in the proper firing order sequence. The signal that is provided by the timing detector circuit 10 through the associated power-up and start circuit 15 and the operating state check circuit 16 to the clock and command circuit 14 is combined with the input signal from the accelerator pedal control 17 to enable the system to distinguish between an acceleration mode of operation and either a steady state or a deceleration mode of operation. It is in this respect that the system of this invention is particularly distinguishable as to other known electronic ignition systems and provides the basis for obtaining the enhanced performance and efficiency of fuel consumption. The functioning of the command circuit 14 is to provide output signals to both the ignition power circuit 11 and to the air-fuel control circuit 12 for coordinating the operation of those two components. The system of this invention is further distinguishable as to other known systems in providing of an electronic distributor that enables the system to be readily adapted to engines with different numbers of cylinders and in effecting control of the fuel-air mixture by means of the electronic ignition system.

ELECTRICAL POWER

The illustrative ignition and fuel control system, as disclosed herein, is adapted to be incorporated with an internal combustion engine of the type conventionally utilized in automotive vehicles that are provided with an electrical power generation system and apparatus. At the present time, those power generation systems are of a 12 volt DC type which usually include an alternator 20 and voltage regulation system 21 in conjunction with a power storage element such as a battery 22. The components in the ignition and fuel control system of this invention are of electronic solid state type and thus utilize, in a general sense, electrical power which has a DC component voltage of 5 volts. This voltage can be conveniently obtained form the existing electrical power systems of automotive vehicles through the voltage regulation system 21 and a voltage reduction circuit 23 which is interconnected with the system component shown in FIG. 1.

For a complete disclosure, it will be seen that there is included in the control system of FIG. 1, an ignition switch 24 which has an input connected to a 12 volt system power and can be selectively positioned in either an "off" position or alternatively in either a "start" or "run" position. In the start position, which is a spring loaded position that would otherwise return the switch to the "run" position, it will be seen that electrical power will then be applied to the voltage reduction circuit 23, to the ignition coils and also to a solenoid circuit 25 for energization of a starter 26. When returned to the "run" position, the ignition switch will continue to energize the voltage reduction circuit 23 for providing the 5 volt DC power necessary for the solid state circuit components in the control system and to also provide 12 volt DC power for other electrically operated components of a vehicle, including the ignition coils for the engine ignition devices. The interconnection of the 5 volt DC electrical power to the system circuit components is not specifically shown, but it will be understood that the appropriate power will be supplied to those illustrated components.

TIMING DETECTOR CIRCUIT

Figure 2:
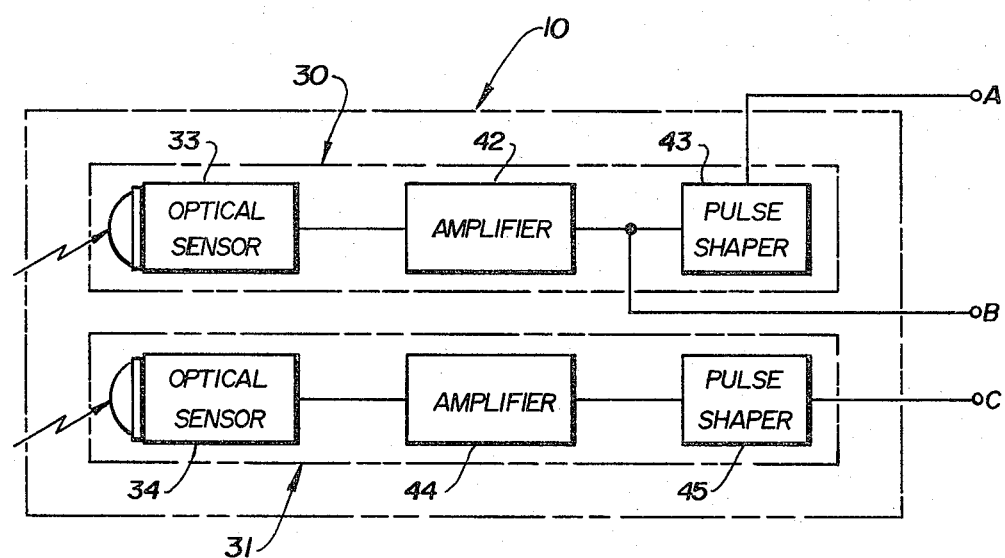
FIG. 2 is an enlarged block diagram of the timing detector circuit.

Included in the timing detector circuit 10 (FIG. 2) are two separate and independent sensing circuits 30 and 31 designated as the primary and secondary circuits. Each of the two sensing circuits includes an optical sensing element 33, 34 which responds to an incident beam of radiation to produce an output voltage signal. The signal produced by each of the respective sensing elements is of a pulse form with the primary sensing element 33 providing a pulse type signal at a predetermined time only in association with the first cylinder in the firing order sequence of the particular engine. Thus, as will become apparent, this signal can be effectively utilized in controlling the initial start-up of the system and each subsequent firing sequence. The secondary sensing element 34 provides a signal at a predetermined time related to each respective cylinder for effecting firing of each cylinder's igniting device at the proper time.

Figure 3:
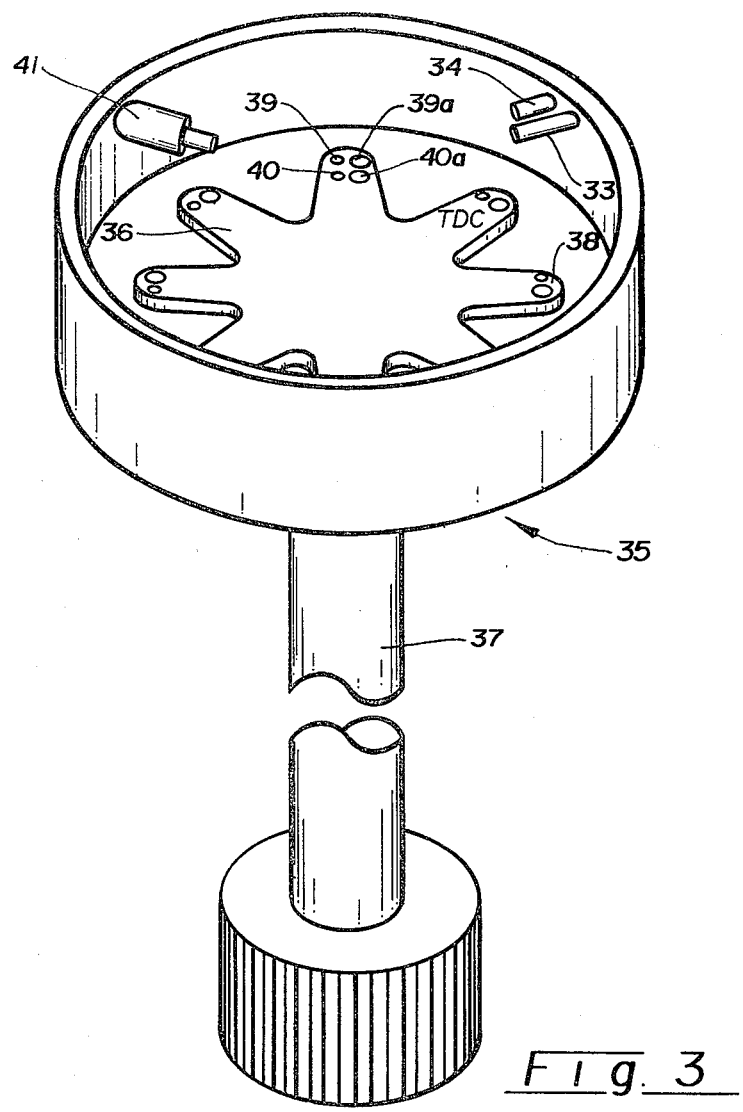
FIG. 3 is a diagrammatic illustration of a timing control device for operation of the timing circuit.

As indicated, timing of the system for selectively energizing respective ignition devices for each of the engine cylinders is initiated by an optical detection system to eliminate the necessity of otherwise providing mechanical switch contacts as found in the mechanical distributor devices previously utilized with internal combustion engines. This optical system is exemplary in the fact that it is capable of providing the necessary input for the system, but the sensing portions thereof may be modified or substituted with other appropriate devices to avoid having direct mechanical contact between components and the system of this invention may advantageously utilize a timing control device 35 such as that which is diagrammatically illustrated in FIG. 3.

The illustrative timing control device 35 resembles a distributor-type timing device and is provided with a multi-lobed rotor 36 that is mounted on a shaft 37 for revolution therewith. This rotor shaft 37 may be mechanically coupled to the engine's cam shaft (not shown) and is driven thereby. A plurality of lobes 38 are provided with the number related to the number of cylinders included in a particular engine with which the apparatus is associated. In this illustrative embodiment, eight lobes are shown for effecting firing of an eight cylinder engine. With this assembly having its shaft 37 coupled by gears with the engine's crank shaft, the rotor 36 will thus be driven in proper rotational relationship to the engine along with the engine's valve cam and is thus coordinated with the opening and closing of the intake and exhaust valves of the engine.

Detection of the predetermined firing points for both initiation of a firing sequence and for the individual cylinders is achieved by an optical system which may be of either reflective or a transmission type. For this purpose, each of the respective lobes 38 of the rotor 36 are provided with a pair of surface elements 39, 39A of disc-form having optically reflective surfaces that are radially located with respect to the center of rotation of the timing rotor so that they pass through an optical transmission path. One of the rotor lobes is provided with a second pair of disc-form reflective elements 40, 40A having optically reflective surfaces that are also radially located so that they pass through an optical transmission path. The pairs of reflective elements 39, 39A are all located on a same pitch circle with the reflective elements 40, 40A located on a pitch circle that is disposed in radially inwardly spaced releationship to the pitch circle of the other reflective element 39, 39A and they are circumferentially spaced a predetermined distance apart.

A suitable illumination source 41 is provided and is positioned to direct a beam of light toward the pitch circles of the reflective elements 39, 39A and 40, 40A in incident relationship thereto, thus forming in cooperation therewith an optical transmission path which, when intercepted by a reflective element 39, 39A or 40, 40A will result in the light being directed toward the respective optical sensing elements 34 and 33. It will be noted with reference to FIG. 3, that the illumination source 41, the sensing elements 33 and 34 and the plane of the reflective element surfaces are relatively oriented to produce a reflective optical transmission path in this illustrative embodiment. If desired, a throughtransmission optical path could be utilized in equivalent alternatives and other modifications and variations could be incorporated in similar functioning apparatus to obtain the same results. The two pitch circles of the reflective elements are disposed in radially spaced relationship so that the same illumination source 41 will form a suitable source of illumination as to the reflective elements in either pitch circle and result in reflecting light to the respective optical sensing element 33 or 34. Thus, the two elements 33 and 34 will provide their respective responses and these elements are preferably of a type which, upon having a beam of illumination incident thereto, will generate an electrical voltage signal pulse that is applied to the timing circuit. The purpose of the pairs of reflective elements is to enable the system to function with a positive mechanically determined initiation and termination point for each signal pulse.

While a specific electro-optical system and physical configuration thereof is illustrated, it will be understood that other sensing devices or mechanisms may be utilized. Suitable alternative structures may also be incorporated with a rotor 36 to provide the necessary voltage signals to either the primary or secondary sensing circuit to initiate a firing sequence or the firing of a respective cylinder ignition device in accordance with the engine's operation.

It is the function of the primary sensing circuit 30 to control initiation of system operation whether it is for initial start-up or for initiation of any subsequent firing sequence compising all of the engine cylinder's ignition devices. Thus, the primary sensing circuit 30 only produces a voltage pulse signal at an output of its sensing element 33 in response to the rotor lobe 38 carrying the reflective surface elements 40, 40A passing through a light beam projected from the illumination source 41. A voltage pulse signal is thus generated at that point and it is related to the time for effecting firing of the first cylinder's ignition device in any particular firing order sequence of all of the engine's cylinders. This signal is routed through an amplifier circuit 42 to a pulse shaper circuit 43 which produces a timing control voltage pulse of desired waveform at an output point A. The amplifier circuit 42 also provides its output signal to an output point B.

The secondary sensing circuit 31, in a manner similar to that of the first circuit which was just described, also functions to provide an output signal in the form of a voltage pulse. However, the optical sensing element 34 responds to each of the reflective surface elements 39, 39A carried by the rotor lobes 38 and thus generates a signal for each of the engine's cylinders. The voltage pulse signal thus generated is routed through an amplifier circuit 44 which includes circuitry to also enable precise adjustment of the timing point to concide with that of the primary sensing circuit 30. The pulse signal from this amplifier 44 is applied to a pulse shaper circuit 45 that responds to produce a desired waveform and a voltage pulse signal at an output point C.

POWER-UP AND START CIRCUIT

Figure 5:
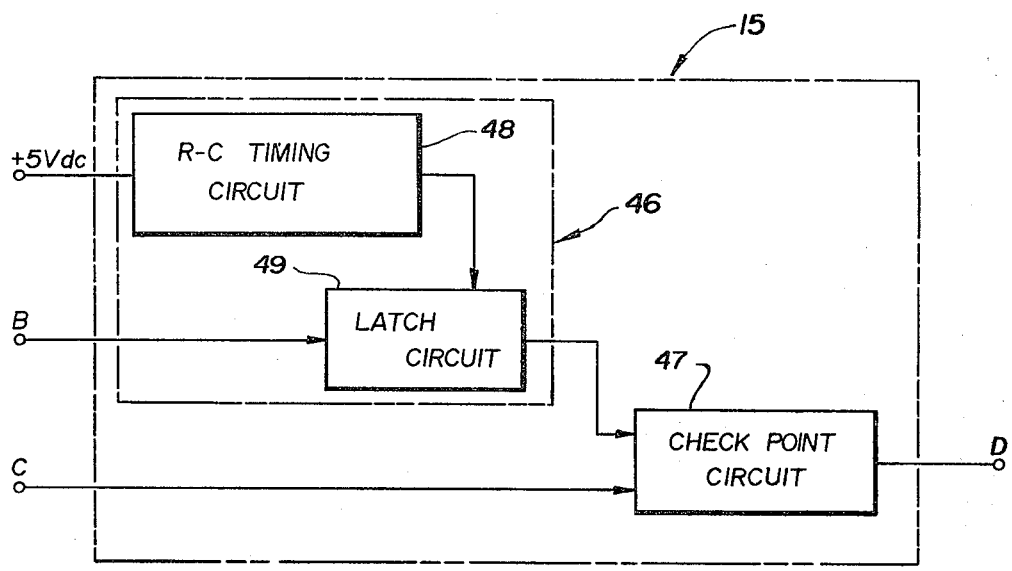
FIG. 5 is an enlarged diagram of the power-up circuit.

Connected to the output points B and C to receive the voltage pulse signals from the timing detector circuit 10 is the power-up and start circuit 15 (FIGS. 1 and 5). This circuit includes a power-up circuit section 46 which receives the voltage signal from the primary sensing circuit at the output B and applies a resulting signal to a check point circuit 47. This check point circuit 47 is functional to produce a one-for-one signal at an output point D resulting from a signal input from point C, but it is only initially enabled to do so if it should also receive a signal from the power-up circuit section 46. Once the check point circuit 47 receives that initial enabling signal from the power-up circuit section 46, it will then continue generation of voltage signal pulses at its output point D. The check point circuit is responsive to each of the pulses it receives at input point C form the second sensing circuit 31 after it receives an enabling pulse from the power-up circuit and will cease to function if, and only if, DC power to the circuit is removed such as will occur if the ignition power switch is turned off. Basically, the power-up and start circuit comprises gating circuits that, in effect, perform the functions of an AND gate. The basic function of the power-up and start circuit is to prevent formation of any ignition pulses at the engine's ignitors and providing a control signal to any other components of the system unless there is first obtained a synchronization of the ignition circuit systems in accordance with the engine firing order. This is accomplished by the obtaining of the two distinct and respective inputs by the sensors 33 and 34 with the respective resulting pulse signals being related to the mechanical positioning of the engine's pistons and relative positioning in the firing cycle. These two sensors are included in the timing detector circuit 10 and provide separate and respective outputs at points B and C. Sensor 33 provides a signal which is related to the beginning of a firing order whereas sensor 34 provides a signal for each of the several cylinders. Thus, the power-up and start circuit of FIG. 5 will only permit application of a controlling signal at point D to the various other components of the system, including the electronic distributor and ultimately to the respective ignitors only if concurrent signals are at least initially received at points B and C. The purpose is to avoid a possible improper firing order at a preliminary start condition when the system is initially activated to effect operation of the engine. Such detrimental operation is prevented by this system which utilizes a gating circuit to only permit initiation of firing pulses when there is a synchronization between the ignition system and the engine.

A problem inherent with logic devices such as gates, decade counters and latching circuits is that it is not possible to predict or control the state in which those devices come up when power is first applied. For example, a gate or a decade counter may come up in a state having an output signal when it has not received the otherwise necessary plurality of inputs. This is an inherent characteristic of such devices and is known to the skilled artisan in this field who apply various techniques to prevent such occurrences if the results would be detrimenal to the system.

FIG. 5 illustrates a power-up and start circuit in which the power-up circuit section 46 includes two components that are of particular advantage in such a circuit as they function to effectively eliminate the problem of the logic circuits coming up in an unknown state at an improper time. This circuit 46 includes an RC timing circuit 48 through which the DC power is applied to a latch circuit 49. The latch circuit will be placed in an operating state upon initial application of the electrical power to prevent formation of a signal at its output until it also receives an input signal at B, but will thereafter remain in a state which provides a signal regardless of the further application of a signal at B. The function of the RC timing circuit is to avoid erroneous operation resulting from transient signal pulses that are usually generated during switching of electrical power to the circuit. This is accomplished by delaying the time at which a voltage of sufficient magnitude will be applied to the reset input terminal of the latch circuit and enable its operation until any transient switching pulses that may have been generated will have disappeared. That resetting voltage when applied to the latch circuit 49 then places the latch in an operating state of "O" output regardless of the state in which it comes up when power is applied. Functionally, the RC timing circuit guarantees that the latch circuit will come up in a known state after the system has been turned on by the ignition switch 24. The latching circuit is thus assured of coming up in a state which is the absence of a signal being applied to the check point circuit 47 (an AND gate) except with application of a signal produced by the sensor 33 and applied at the terminal point B to this latch circuit. After a predetermined time interval from turn-on of the ignition switch 24, a small fractional part of a second in reality, the subsequent application of a signal formed by the sensor 33 will result in operation of the latch circuit to a second state where it will provide a signal to the check point circuit 47. The latch circuit functions in a manner as to maintain itself in this state until such time as the power is removed from its reset input as applied through the RC timing circuit. Although there will be subsequent signals periodically provided at terminal point B, the latch circuit will remain in this latch position to provide a continued signal to the one input of the check point circuit 47. Consequently, the periodic application of a signal from the sensor 34 at its terminal point C, will result in production of a related periodic control signal at terminal D which is the output of the power-up and start circuit 15.

This specific circuitry for an exemplary power-up and start circuit 15 which includes the RC timing circuit and the latching circuit, comprises specific circuit features that are of advantage, but are not the only means for providing of the basic control functions. In its basic form, which is that illustrated in the application, a signal is generated to be provided by the power-up circuit section 46 and is continued to be applied during any firing order cycle to the check point circuit 47. This can be accomplished by various common circuit techniques such as delay-type circuits, or other latch-type circuits. Other circuits and techniques are known to the skilled artisan and could be routinely applied to achieve the inventive objectives of obtaining synchronization of the electronic timing circuit signals to the physical cylinder position and firing order.

IGNITION POWER CIRCUIT

Figure 4:
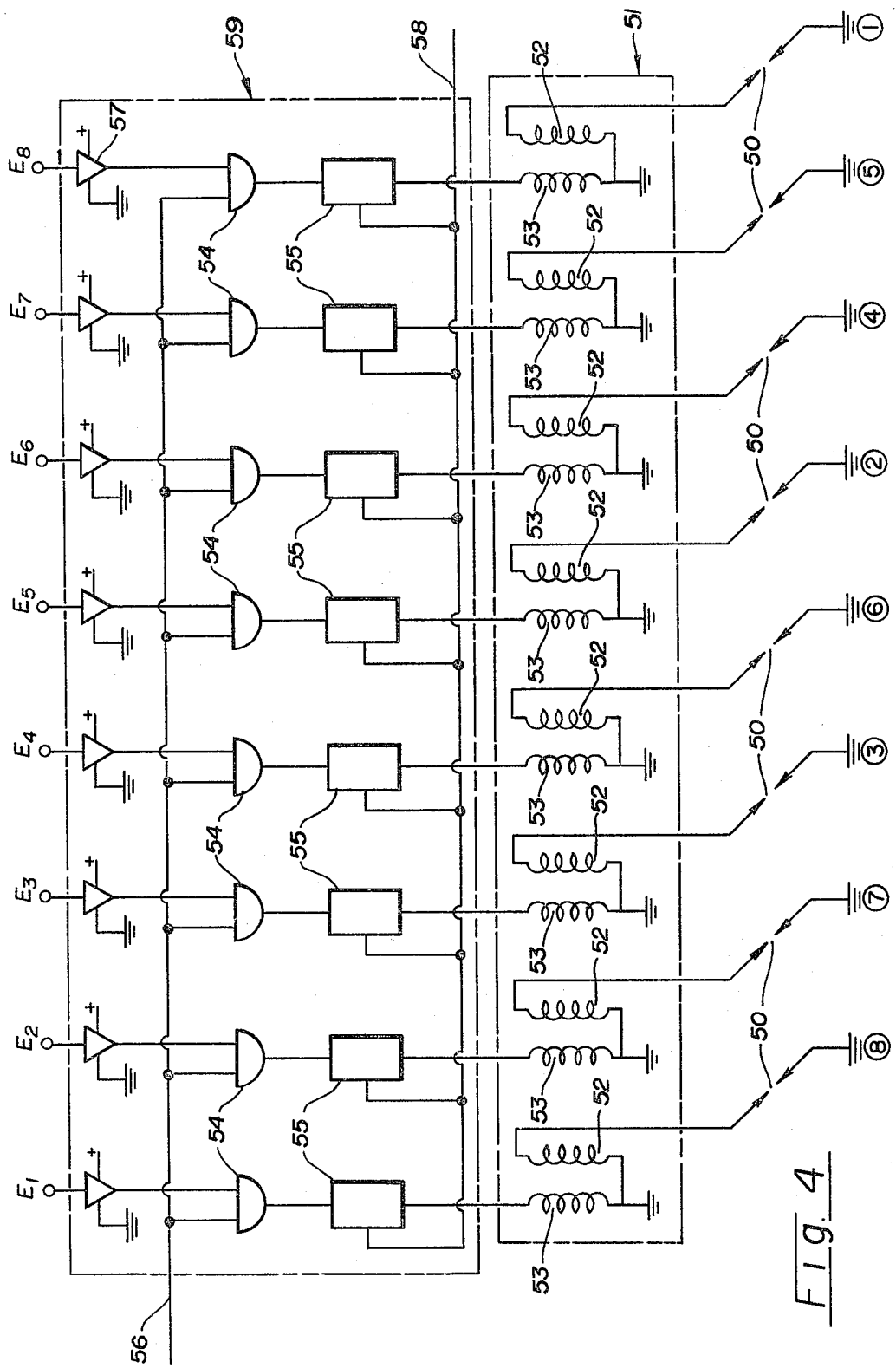
FIG. 4 is an enlarged diagram of the ignition power circuit.

The ignition power circuit 11 as shown in greater detail in FIG. 4 has each of its several outputs connected to a respective ignition device 50, such as a conventional spark plug, that is associated with a particular set of cylinders in an internal combustion engine. The illustrative system is for an eight cylinder engine and a corresponding number of outputs are thus provided from the ignition power circuit with a typical firing order sequence indicated by a respective circled number 1–8 placed adjacent each ignition device. A high voltage ignition pulse is provided to each of the respective ignition devices by respective independently energized ignition coils 51 (collectively indicated in FIG. 1). Those ignition coils have primary and secondary windings arranged in a conventional manner with the secondary windings 52 being connected to the respective ignition device. Application of a voltage pulse to a primary winding 53 of a coil resuts in a flow of current through the primary winding that generates and develops the high voltage firing pulse in the secondary in accordance with the turns ratio of the two windings. As previously indicated, an important objective in having an independent ignition coil 51 for each ignition device is that it is more technically feasible to construct a number of relatively smaller coils than a single and consequently larger coil capable of handling the require duty cycle for a multiple pulse type firing system for multiple ignitors. Since each coil is only required to have an active duty cycle that corresponds with the firing of a single ignition device, it will be seen that the power handling capability of each may be significantly lower than for a single coil for all ignitors as the power requirements are thus divided between several ignition coils.

Energization of each respective ignition coil 51 is controlled by a respective gating circuit 54 and an amplifier circuit 55. The gating circuits are all of the same type and require two inputs to place the gating circuit in an "on" condition and thus transmit a voltage signal. The one input of each gate is tied to a common input conductor 56 which receives the firing signal pulses, either multiple or single, from the clock and command circuit 14. The other input of each of the gating circuits is interconnected through respective NOT gates 57 to the distributor circuit 13 which enables transmission of a firing control signal to each of the respective gates as determined by that distributor circuit. Interconnected between the outputs of each of the gates and the respective ignition coil is a respective transistorized power amplifier circuit 55 which functions to control the application of electrical power for energizing the primary winding 53 of each ignition coil 51 with an electrical current adequate to enable the secondary winding 52 to generate the firing pulse at the ignition device 50. Interconnection of a power input terminal of each amplifier circuit 55 to the power source is indicated by the common conductor 58. All of the gating circuits 54, amplifier circuits 55 and NOT gates 57 are collectively indicated by the block 59 in FIG. 1 and generally designated as the ignition switch circuit. Operation of this ignition switch circuit is that while a firing signal pulse is concurrently applied to each of the respective gates 54, only one gate will be enabled to provide an output since only one gate will receive a firing control signal from the distributor circuit 13 at any ignition time period for a respective cylinder ignition device 50. That gate which is enabled will remain so for a time period as determined by the continued application of a firing control signal to the respective input $E_1$–$E_8$.

DISTRIBUTOR CIRCUIT

The distributor circuit 13 comprises two major components which are identified in the drawings (FIGS. 1 and 6) as a pulse count circuit 60 and a firing select circuit 61. Solid state circuit components embodying integrated circuit designs are commercially available for each of these two components and are capable of the respective function. Exemplary of such commercially available components are devices designated in trade channels as SN74163 for the count circuit 60 and SN74155 for the firing select circuit 61, both of which are manufactured by Texas Instruments, Inc.

The firing select circuit comprises a series of gating circuits and a logic circuit for effecting the selecting function and has outputs $E_1$–$E_8$ that are each interconnected with a respective gating circuit 54 of the ignition switch circuit 59. Three inputs are provided to this circuit with the one input being a multiple input received from the pulse count circuit, the second being the pulse signal received from the timing detector circuit via the power-up and start circuit 15 and operating state check circuit 16, and the third being an enable signal also received from the operating state check circuit. The pulse signal is primarily related to the voltage pulse signal generated by the secondary sensing circuit 31 and it is this voltage pulse received from the timing detector circuit that produces the firing control signal as ultimately transmitted to the specifically selected gating circuit 54 of the ignition switch circuit 59. The enable signal is applied at a terminal DEN of the firing select circuit 61 via the operating state check circuit 16 and is operative to prevent initiation of operation for a predetermined number of pulse signals as related to the primary sensing circuit 30 received through point A. Operation, in general, is such that each time that a rotor lobe 38 and its reflective element 39 is rotated to a position to be effective in operation of the optical sensing element 34 and effects the production of a voltage pulse at the output C of the timing detector circuit 10, there will be a voltage pulse generated by the firing select circuit 61 at the one respective output (E1–E8) and which will be transmitted to the appropriate gating circuit 54.

Since it is the function of the firing select circuit 61 to produce the desired firing order, it will be seen that this firing select circuit has the corresponding number of outputs E, eight in the illustrative embodiment for an eight cylinder engine. Each output is connected to a respective gating circuit 54 in the sequence of the engine cylinder firing order. It will be noted that a specific firing order is obtained by a particular interconnection of those gating circuits through the ignition switch circuits 59 as between the firing select circuit and the ignitors 50 with that order indicated by the numerical cylinder identification of the ignitors.

Operation of the firing select circuit 61 to sequentially select each of the respective outputs E in sequence is effected by an input received from the pulse count circuit 60. At each instance when an input signal is received from the count circuit 60, the firing select circuit 61 will be advanced to the next output position so that a signal related in time to the pulse signal produced by the timing detector circuit 10 at D will be concurrently generated at the next sequential output of the firing select circuit.

The operation to sequentially advance the firing select circuit 61 is accomplished by means of the pulse count circuit 60 which is designed in accordance with the number of cylinders in the particular engine with which the apparatus is to be utilized. Thus, in the case of an eight cylinder engine, the pulse count circuit 60 is operative to note the accumulation of a sequence of input pulses to its circuit and, after eight such pulses are counted thereby indicating completion of a firing order, it will be effective at the next input of A of a signal generated by the timing detector circuit 10 to result in the formation of a signal at X as referenced to FIG. 6 to reset the firing select circuit 61 to its initial position and begin the next sequential firing order. To accomplish this objective, the pulse count circuit is provided with two inputs (X and Y), one of which is the same voltage signal as the signal provided to the firing select circuit. That signal is a voltage pulse received at D from the timing detector circuit 10 via the power-up and start circuit 15 and the operating state check circuit 16 at its output Y, and since such a pulse is formed each time a reflective element 39 associated with a particular cylinder associated with the timing rotor 36 actuates the second optical sensing element 34, there will be a signal pulse transmitted to the pulse count circuit and recorded therein.

Initial timing of the apparatus in initiating operation is necessary to assure that there will be a correspondence as between the timing rotor 36 and the firing of the respective cylinders. In this circuit, this is accomplished by applying an input to the distributor circuit 13 at a time which is determined by the master rotor timing lobe 38 that carries the second reflective element 40 passing through the optical path to the first optical sensing unit 33 at the prescribed time. Control as to start-up is thus obtained by a voltage pulse signal, termed the start-up pulse, which is produced by the first optical sensing element 33 and its associated circuitry in accordance with the position of the master rotor lobe. As a consequence of that start-up pulse, it will be seen that a signal is provided by the first sensing circuit 30 within the timing detector circuit 10. That output at both points A and B is only provided at the time the master timing lobe is effective in causing the first optical sensing element 33 to produce a pulse that is only associated with that timing lobe and thus controls initiation of a firing order sequence which normally begins with the first cylinder.

Upon providing of that start firing pulse by the primary sensing circuit 30 via point A and the operating state check circuit 16, that signal is applied to an input of the pulse count circuit 60 which resets the pulse count circuit and also simultaneously produces an initiation of the counting sequence and will thereafter reset the pulse count circuit for each firing order sequence. Concurrently, there will be a signal provided by the secondary sensing circuit 31 that is operative on the pulse counting circuit and is effective in applying to the firing select circuit 61, a controlling signal which enables providing of a firing control signal through that circuit at its output terminal $E_1$ to the respective gating circuit 54 associated with the first cylinder in the firing order sequence. This resetting of the pulse count circuit 60 will occur after the end of every firing order sequence.

As indicated, the illustrated system is designed for utilization with an eight cylinder engine. It will be readily apparent that the system can be adapted to other engines having any other number of cylinders through the first sensing circuit 30 obtaining the necessary input pulse from its optical sensing element 33 after the end of each firing order sequence for that particular number of cylinders. As a matter of expediency and economy in manufacturing of the illustrated apparatus, it is contemplated that the adaption of the circuit can be accomplished through the first sensing circuit 30 modifying the pulse count circuit 60 to the extent that it will function to count the intended number of pulses associated with the corresponding number of engine cylinders. Accordingly, the outputs E of the firing select circuit 61 that will be effective will be limited to those which are required for a particular engine, whether a six or a four cylinder engine, or even a five cylinder engine as the case may be. This will be true regardless of the fact that a districutor circuit 13 may have a capacity for a larger number of outputs.

OPERATING STATE CHECK CIRCUIT

Figure 6:
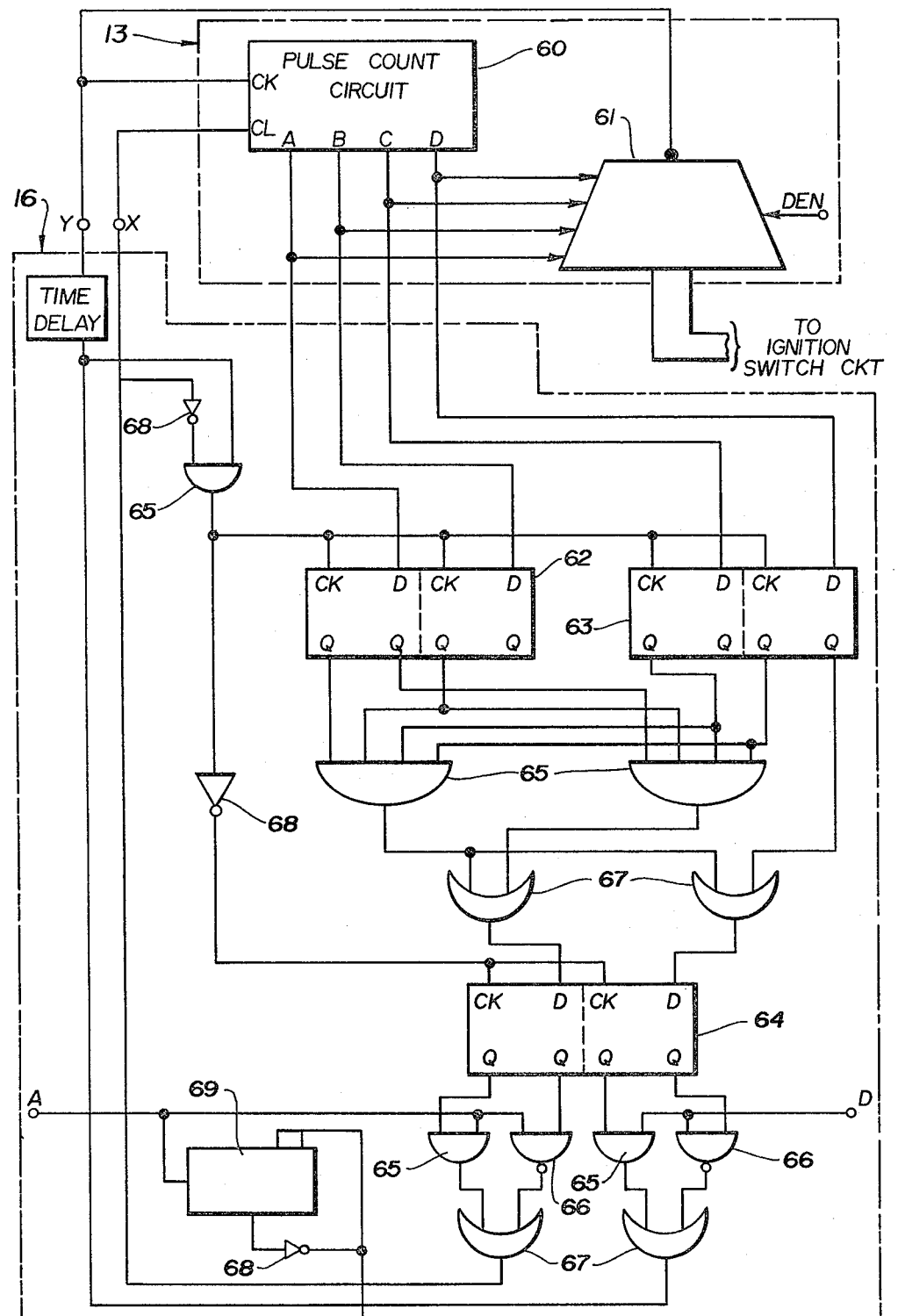
FIG. 6 is an enlarged diagram of the distributor circuit and the operating check circuit.

An operating state check circuit indicated generally by the numeral 16 and shown more specifically in FIG. 6 is designed to eliminate an error that can occur in the initiation of system operation. An error may be induced in the initiation due to the fact that the lobes of the rotor 36 are provided with pairs of reflecting elements 39, 39A, 40 and 40A. The specific location of a rotor lobe relative to the time at which either or both sensors 30 and 31 would initially "see" a particular rotor lobe may affect whether the timing detector circuit 10 is initiated with a plus voltage or in a zero voltage state. The system is preferably designed such that it is expected that the sensors will first see the first reflective element 39 or 40 to initiate the signal and then see the reflected element 30A or 40A and terminate the pulse generation. However, since rotation of the engine is not mechanically interconnected or electrically interconnected to the system in any manner, it is necessary to provide some means to determine whether operation has been initiated by the first or second reflective element in a set and to then determine operation at all subsequent times based on either that sensed signal or on a corrected signal. It is for that purpose that the operating state check circuit 16 is provided in this system and is interposed between the outputs A and D of the timing detector circuit 10 and the inputs to the distributor circuit 13 or to other components of the system.

Figure 7:
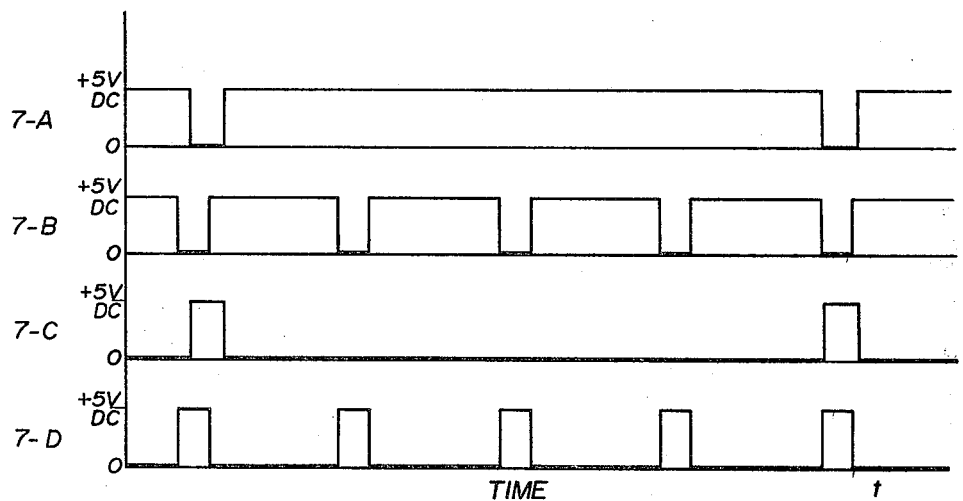

The problem that is to be resolved by the operating state check circuit is graphically illustrated in FIG. 7. Referring to lines 7A and 7B, it will be seen that these indicate the pulse signals that are formed with reference to a desired time point. FIG. 7A shows the the pulse signal that is formed by the primary sensing circuit 30 which is in an on-state with the reflective element 40 operative to cause the voltage generated by that circuit to go to a zero state at the reference time. This zero state exists for a relatively short interval of time which is determined by the time-related spacing of the two adjacent reflective elements on a particular rotor lobe. In this instance, the off or zero state is determined by that period of time between passage of the first and second elements 40, 40A through the optical transmission path. Similarly, the pulse signal that is formed by the secondary sensing circuit 31 is that illustrated in FIG. 7B. A system utilizing four cylinders is illustrated for simplicity of illustration and it will be noted that the secondary sensing circuit is thus forming four pulses during the time interval of a single pulse by the primary sensing circuit. FIGS. 7C and 7D illustrate an exact opposite situation that is developed when the system components come up in an error-type signal. In this instance, they are shown as coming up initially in a zero state rather than the desired onstate. With the pulse signals as thus formed in FIGS. 7C and 7D, the remainder of the circuit would operate erroneously and it is thus preferred to provide a system for obtaining correction and elimination of this problem. Additionally, it will be understood that other error inputs could be obtained in that rather than the two sensing circuits providing synchronized pulse signals even though erroneous, they may come up in states such that they would provide opposite signal conditions such as a combining of FIG. 7B secondary pulse with the FIG. 7C primary pulse. A second or fourth alternative condition would be that of combining FIG. 7A with 7D.

It is the function of the operating state check circuit 16 to compare inputs as from points A and D which are related to the signal signals generated by the sensing circuits and, through a feedback network, to determine which state the circuits have come up in and to then analyze that determination and subsequently apply correct signals to the remainder of the system. This is accomplished by applying an input from the distributor counter circuit 60 to the feedback network which operates through latching circuits 62, 63 and 64 that enable the system to periodically retain the results of the signals at a particular instant in time and then to compare those results to determine what state the signals are in. In the illustrated circuit, the latching circuits are commercially available devices designated in the trade as SN7474 and such devices are produced by Texas Instruments, Inc. These latching circuits are interconnected through gating circuits comprising AND gates 65, AND gates 66, OR gates 67 and NOT gates 68 connected in an exemplary logic arrangement as shown in FIG. 6 such that the circuit is ultimately able to determine whether a particular pulse signal is a true and correct pulse or whether it is in error and the system then functions to provide a corrected signal. With this circuit, it is not necessary that control circuitry be provided to assure that each of the sensing circuits will come up in the proper state such as the desired on-state.

In the operation of this system, it is necessary that initiation of any firing sequences by the firing select circuit 61 be delayed for an interval of time. The operating state check circuit is capable of operating in a very short period of time and only two cycles are required to enable it to determine the operating states and make the necessary correction. Accordingly, a delay is provided by means of a counter circuit 69 (an SN74163 device) which receives an input from point A and counts the pulses that are received therefrom. Once the counter has received the third pulse generated by the primary sensing circuit 30, it is operable to apply an enable signal to the enable input DEN of the firing select circuit 61. This counter circuit operates such that upon receipt of the third input pulse, it will remain in an on-state until the system has been disconnected from the primary power source.

CLOCK AND COMMAND CIRCUIT

The clock and command circuit 14, as provided in accordance with this invention, provides the primary control of the functions of two components which are the ignition power circuit 11 and the fuel-air control circuit 12. Included in the command circuit is an acceleration, deceleration and steady state clock control circuit (ADS circuit) 70 which has inputs from the timing and detector circuit 10 via the powerup and start circuit 15 and operating state check circuit 16, a mode check point circuit 71, a deceleration clock circuit 72 and an acceleration clock circuit 73. Additionally, a performance command input signal is initially obtained by a manually controllable electrical circuit element 74 of the accelerator input control and which provides an analog voltage output in accordance with physical displacement of an operating element thereof. The operating element for this electrical circuit element 74 is diagrammatically indicated as an input force vector V, but which may be the manual operator force applied to a structure that corresponds with the conventional accelerator pedal found in automotive vehicles. In accordance with this system, a steady state operation is obtained when the electrical circuit element 74 is maintained in a selected position resulting in a constant input signal to the circuit. During such operation, a controlling clock signal related to the pulse or clock signal that is generated at point Y, and which clock signal is designated as a steady state clock signal, is applied to the ignition power circuit 11 and to the fuel-air control circuit 12. In an acceleration mode of operation, optimum operation is obtained through the multiple pulse firing of the ignition devices 50 and this is achieved through utilization of the relatively high rate voltage pulses generated by the acceleration clock circuit. Operating the electrical circuit element 74 as for acceleration generates a performance command input signal that is functionally operative through these system components to enable application of the acceleration clock signal. For deceleration, operation of the electrical circuit element 74 as for deceleration results in generation of a command input signal that produces a clock signal that is of a slower rate than steady state and is applied to the fuel-air control circuit 12.

Utilization of an input circuit element similar to a conventional accelerator pedal maintains a degree of similarity of operation as between an automotive vehicle engine provided with the ignition and fuel control system of this invention and engines heretofore provided with a mechanical interconnection between an accelerator pedal and a conventional carburetion mechanism. Although it is indicated that a manually operable element 74 is provided, it will be understood that other inputs may be utilized such as that which may be obtained from automatic speed control mechanism often used on automotive vehicles. It will also be noted in subsequent explanation of the fuel-air control circuits 12 and associated dispensing devices 18 that the accelerator pedal may also retain a mechanical connection to the dispensing device for certain control functions.

In this illustrative embodiment of the accelerator input control 17, the controllable electrical circuit element 74 shown in FIG. 8 is shown in greater detail in FIG. 9 and comprises an electrical potentiometer device 75 having a resistor element connected across a voltage power cource and a movable contact element 75a. The contact element is coupled to a selectively actuable pedal mechanism 76 by a mechanical linkage 76a and is thus readily operated by the vehicle operator. Operation of the controllable element 74 follows the same functional sequence as with conventional vehicle accelerators in that the pedal mechanism 76 may be displaced in either direction to concurrently displace the contact element 75a in accordance with the desired control function to achieve acceleration or deceleration or to maintain the vehicle at a steady state operating speed by holding the contact element at a fixed position. Consequently, a voltage putput obtained by the movable contact and provided at an output lead 77 will be proportional to the physical displacement of that contact with respect to the fixed resistor element and forms an analog voltage output signal.

Also included in the clock and command circuit 14 is an analog-to-digital converter (A/D) 78. The A/D converter receives the input voltage signal from the potentiometer 75 and converts that analog signal to a digital signal which in a binary system is either a zero or one output. For the illustrative purposes of this invention, the A/D converter is of a type having eight output lines and thus results in the formation of an output signal associated with a particular position of the accelerator potentiometer. With the eight lines it is thus possible to obtain 256 different signals which results in a sufficient number of step points for smooth operation of the apparatus. It will be readily apparent that increasing the number of outputs to obtain even a greater number of signal points results in a system that is capable of operating with less differentiation as between adjacent points associated with a particular accelerator pedal position as a consequence of a lessor incremental change. The output from the A/C converter 78 is applied to the deceleration rate control circuit 79 which operates in response to receipt of that signal to generate an output which is applied to the deceleration clock circuit 72. The output from the A/D converter 78 is also applied to the mode check point circuit 71 which functions in response thereto to apply an appropriate input to the ADS circuit 70 for the specific operating mode that is determined.

In the illustrative embodiment of this control system, the deceleration rate control circuit 79 comprises a read only memory (ROM) that is designed to generate output signals that bear predetermined relationships to the degree of change in the output of the A/D converter 78. Specifically, the ROM is programmed to react proportionally to greater or lessor incremental changes over a predetermined time interval and generate a related signal. By utilizing a ROM, it is possible to develop a control that reacts in a particularly desirable manner and generate an output signal that takes into account both rate of change and the relative operating point from which the deviation at any particular instant in time is to be determined. Such a circuit can be readily designed to operate in accordance with a selected characteristic, either linear or non-linear.

The deceleration clock circuit 72 functions in response to the signals input thereto to determine the deceleratin clock rate in generation of an output deceleration clock signal. In addition to receiving a signal from the deceleration rate control 79, a clock signal is received from the secondary sensing circuit 31 via output Y of the operating state check circuit 16 and which is at a rate proportional to the engine speed. The deceleration rate control circuit 79 is operationally responsive to the input received from the A/D circuit 78 and is determinative of the rate at which a deceleration mode of operation is occurring. The output signal from the deceleration rate control circuit 79 that is applied to the deceleration clock circuit is thus related to the deceleration rate and is operative with respect to that clock circuit to modify the rate of the clock signal received from output point Y. The clock signal received from the output point Y is reduced in accordance with the ROM and the deceleration rate and the signal that is provided to the ADS circuit 65 by the deceleration clock circuit will be a slower rate pulse signal than the clock signal received from output point Y. Accordingly, the greater the deceleration for a specific time period, the greater will be the reduction in the clock signal rate and, as a consequence, a larger decrease in the output clock rate of the deceleration clock circuit.

The output of the A/D converter 78 is also applied to the mode check point circuit 71 which is functional to ascertain whether the controllable electric circuit element 74 is being operated to effect either acceleration or deceleration or is being maintained at a last attained position. The output of the mode check point circuit 71 comprises control signals which are input into the ADS circuit 70. Along with this input, the ADS circuit has three clock inputs which include an input from the acceleration clock circuit 73, the deceleration clock circuit 72 and a steady state clock signal which is the output at point Y from the timing detector circuit 10 via the power-up circuit 15 operating state check circuit 16. Functional operation of the ADS circuit 70 is that application of an input signal from the mode check point circuit 71 to the ADS circuit will be operable to enable the ADS circuit to determine which of the three input clock signals will be provided at the respective output points F and G.

In the case of a deceleration mode of operation, as a consequence of the signal provided by the A/D circuit 78, the mode check point circuit 71 senses the deceleration condition and thereby provides an input to the ADS circuit by a first output thereof. This condition results in the ADS circuit operating to provide the voltage pulse concurrently received from the timing detector circuit at output point Y to output point G, that is, the steady state clock, and to provide the signal from the deceleration clock circuit 72 to output point F. Output G is connected by the conductor 56 to each of the gating circuits 54 of the ignition switch 59 and application of the steady state clock will thus result in application of a single firing signal to the ignition system and only a single spark will be produced at the ignition device 50 for the specific cylinder at each firing time point. Simultaneously, an output signal is provided to the air-fuel control circuit 12 via output point F, but at the clock rate of the deceleration clock circuit 73.

The situation as to a steady state operating condition will have the same effect as with a deceleration condition in that the voltage pulse from the timing detector circuit 10 via output point Y, the steady state clock, will continue to be applied to output point G through the ADS circuit 70. The mode check point circuit 71 senses the steady state mode and applies an input signal to the ADS circuit 70 which enables that circuit to provide the steady state clock output to the gating circuits 54 of the ignition switch circuit 59. Simultaneous application of a firing control signal to a respective one of the gating circuits 54 as determined by the particular point in the firing order sequence attained by the firing select circuit 61 will then result in a single spark being produced at that particular ignition device 50. A clock signal will also be applied to the output point F for air-fuel control circuit 12 and, in this mode, that signal is the same steady state clock signal that is applied to the output point G.

In the situation where an acceleration condition exists, the mode check point circuit 71 will sense that condition and provide a signal at its third output. That acceleration signal is applied to the ADS circuit 70 where it will function to permit the signal produced by the acceleration clock circuit 73 to be applied to both of output points F and G. This results in application of a multiplicity of firing pulses at the rate determined by the acceleration clock circuit 73 that will then be applied to the respective ignition device 50 which can then be fired as determined by the firing select circuit 61. The signal pulses at the rate provided by the acceleration clock circuit 73 are also applied to the fuel-air control circuit 12 via the output point F of the ADS circuit.

ADS CLOCK CONTROL CIRCUIT

A specific circuit for an exemplary embodiment of an acceleration/deceleration/steady state clock control circuit 70 (ADS) is illustrated in detail in FIG. 10. Such a circuit comprises logic circuit elements such as the well-known AND and OR type gating circuits. In this circuit, four AND gates 80 A-D are interconnected in conjunction with two OR gates 81A, 81B to function in response to inputs received via one of the three inputs from the mode check point circuit 71 and a respective clock signal received from one of the acceleration clock circuit 73, deceleration clock circuit 72 or a steady state clock signal received from the timing control circuit 10 via output point Y. Each of the three clock signals is continuously provided to its respective ADS input. The ADS circuit has two outputs which, as previously described, are identified as terminals F and G. For a steady state operating mode, a signal will be received from the mode checkpoint circuit 71 via the conductor identified as "steady state" and that signal is applied to the AND gate identified as 80C. Also applied to the inputs of the ADS circuit will be the steady state clock signal via the conductor identified as "steady clock". That steady clock signal is applied to both AND gates 80C and 80D, but would be only effective as to gate 80C. This AND gate functions to then produce an output signal which is concurrently applied to a respective input of both of the OR gates 81A and 81B. These latter two gates function in response to the receipt of that single input signal to produce a respective output at points F and G which, in this case, will be the steady state clock signal. For an acceleration operating mode, there will be an input applied to the ADS circuit from the mode checkpoint circuit via the conductor identified as "acceleration". That signal is applied to the first AND gate 80A and will thus enable that gate since it is concurrently receiving the clock signal from the acceleration clock circuit 73. Since none of the other AND gates are concurrently receiving the required two signals, it is only the AND gate 80A which is functional at this point and thus results in passing of the acceleration clock signal to each of the two OR gates 81A and 81B. Each of those two gates then functions to pass that same acceleration clock signal to the respective output points F and G. For a deceleration condition, the only signal applied to the ADS circuit from the mode checkpoint circuit will be that transmitted via the "deceleration" conductor. That signal is applied to two of the AND gates 80B and 80D and results in enabling of each of those two gates. The AND gate 80B which also has an input connected to the deceleration clock circuit 72 thus passes the deceleration clock signal to the first OR gate 81A and it is that deceleration clock signal that is applied to the output point F. Concurrently, the AND gate 80D is enabled and passes the steady state clock signal to the second OR gate 81B which then passes that signal to the output point G.

MODE CHECK POINT CIRCUIT

Functioning of the mode check point circuit 71 is further illustrated by a specific circuit shown in FIG. 11. This circuit is designed to determine at any particular point in time of operation whether the vehicle is in an acceleration, deceleration or steady state mode of operation. Since the A/D converter 78 provides a digital indication of the desired operating point, any change in operation from a prior selected time will be evidenced by a change in the digital signal. By comparison of the digital signals for two different operating times, it is possible to generate a signal that is appropriate to either indicate the fact that there is steady state operation or that there is a relative increase or decrease in the digital signal and thus indicative of acceleration or deceleration. The mode check point circuit 71 embodies circuitry to make this comparison and to then analyze the results through logic circuitry to produce a selected output that is then applied to the ADS circuit 70 for the aforestated purposes. A detailed block diagram is shown in FIG. 11 for a specific mode check point circuit 71, although it will be understood that this circuit is exemplary.

With respect to the mode check point circuit illustrated in greater detail in FIG. 11, it will be noted that this exemplary circuit includes, as the generalized components thereof, two latch circuits 82 further identified as A and B, an arithmetic logic unit, or ALU 83 such as SN74181 which is commercially available, and an output logic circuit 84. Additionally, to facilitate the functioning of the several units, a logic timing circuit 85 is incorporated having interconnection as between the latches, ALU and logic circuit. A digital input is received from the A/D converter 78 and is applied to the respective latch circuits 82A and 82B. Upon completion of the operation of these several circuit components at a particular time period, an output is formed which is provided at one of the three outputs designated as steady state, deceleration or acceleration and provided to the ADS circuit 70.

The latch circuits are well-known, commercially available devices and operate to retain a last received digital signal until caused to change by a new and different input. The ALU which is also a standard device utilized in computer or microprocessing systems, is advantageously used in a subtracting mode such that in its comparison of the respective inputs from either latch A or latch B, it provides a difference output signal as would be determined in normal arithmetic subtraction calculations. In the instance wherein the signals are the same, the ALU would then provide a signal which is indicative of that condition.

Operation of the circuit of FIG. 11 is initiated at a point in time by a signal being provided from the A/D converter 78 to both latch A and latch B. However, the logic timing circuit 85 is initially assumed functional to result in only latch A being responsive to that digital input. This occurs at what would be defined as an instant of time $T_1$. At a predetermined time later, which is time $T_2$, the logic timing circuit would have functioned to enable latch B to receive and respond to the digital input. Once both latch A and latch B have responded to inputs from the A/D converter at these different instances of time, the logic timing circuit then provides a control signal via its output X to initiate operation of the ALU 83 to effect the comparison between the outputs then provided by the respective latch circuits. The result of the comparison by the ALU is then applied to the logic circuit and is effective to result in the desired and appropriate output for the particular condition. If there is no difference in the outputs of latch A or latch B signifying a steady state operation, the logic circuit 84 is also operable to input a signal to the logic timing circuit 85 to disable the A output to latch A and generate a signal at its steady state output. The consequence of this is that the logic timing circuit 85 will then, at the predetermined time interval later with respect to time $T_2$ at a new time $T_3$, input a signal to latch B to again cause latch B to function and respond to the digital signal then generated by the A/D convertor 78. If there is then a difference between the digital signals as between that of latch A and that of latch B, the ALU 83 determines that difference and operates to cause the logic circuit to function in selecting either the acceleration or deceleration output as determined whether it is a negative or positive difference and generate a signal at the respective output. Concurrently, the logic circuit in a difference signal situation will apply a control signal to the logic timing circuit to enable that circuit to again apply an output at A to cause latch A to again function and receive the digital signal at this new time. The comparison sequence then proceeds at the prescribed predetermined time interval to provide a continuing monitoring of the operating condition of the vehicle.

DECELERATION CLOCK CIRCUIT

A more detailed circuit for the deceleration clock 72 is shown in FIG. 12. This circuit which is deemed exemplary for the intended purposes comprises a counter circuit 90 that may be of the previously defined type SN74163, and a logic circuit 91. The logic circuit includes four AND gates 92 and an output OR gate 93. Each of the AND gates has one input connected to a respective one of the outputs A-D of the counter and the other input connected to a respective one of four outputs from the ROM of the deceleration rate control circuit 79. Operation of the deceleration rate control circuit 79 is such that it provides an output in a binary system resulting in a voltage being applied or not applied to the outputs in any one of 16 combinations in the illustrative four output system. Similarly, the counter 90 is a binary system device and it also provides or does not provide an output voltage at is output terminals in a binary code in accordance with the number of pulses that it has counted at a particular instant in time. Operation of the counter is to provide an output pulse train at its terminals A, B, C and D at $\frac{1}{2}$, $\frac{1}{4}$, $\frac{1}{8}$ and 1/16 of the input clock rate received from point Y. The results is that for an instantaneous operating condition, one or more of the AND gates 92 will be enabled and the total outputs passed by the OR gate 93 will be a pulse-form signal designated as the deceleration clock signal having a rate that is less than the steady state clock input to the circuit via input point Y. It will be noted that since the steady state clock has a rate proportional to engine speed, the deceleration clock signal will be a function of both the rate at which the change is occurring and the engine speed. The illustrative system is limited in its ability to divide the steady state clock, but a greater number of divisions can be obtained by adding another counter to operate in cooperation with the illustrated counter and thus provide a combined eight terminal output for a 256 bit count. The number of AND gates 92 would also be increased by four and the ROM of the deceleration rate control circuit 79 would be designed with increased capacity to have eight outputs resulting in a 256 bit count. Increasing the system capacity in this manner provies a smaller incremental division thereby enhancing smoothness of operation.

AIR-FUEL DISPENSING DEVICE

Two embodiments of an air-fuel dispensing device generally designated by the numeral 18 are respectively illustrated in FIGS. 13 and 14 for utilization with the control system of this invention. The dispensing device shown in FIG. 13 is a composite structure that is designed to enable adaptation of the control system of this invention to an existing vehicle carburetion system. A conventinal carburetion system, as is diagrammatically illustrated, basically comprises a housing 100 having a passageway 101 through which air is drawn into the engine and is combined with fuel that is drawn into the air steam as a consequence of the venturi effect or by positive injection. In this diagrammatic illustration, the housing 100, in general, represents a carburetor body and has an upper end through which the air is drawn into the passage 101. Positioned in the upper end of that housing is a valve element normally designated as a choke plate 102 which functions to control air flow and consequently the fuel to air ratio in accordance with parameters such as engine temperature as well as other factors. During normal starting operations of an engine, and also when the engine temperature is relatively low, the choke plate 102 is displaced to a position to restrict air flow to a greater degree, and thus, increase the fuel air ratio as the fuel drawn into the carburetor is primarily dependent upon the setting of a throttle plate indicated generally at 103. The control for the choke plate 102 is indicated as being a temperature control mechanism 104 and may embody the conventional heat responsive mechanisms commonly provided with the carburetors presently utilized with vehicle engines. Alternatively, a manual operated mechanism may be provided to permit the operator to manually position the choke at a desired point rather than utilize automatic control mechanism such as that which is illustrated. Fuel is provided to the conventional carburetor by a system indicated generally at 105 as comprising a fuel line and its connection to the housing 100. Fuel is caused to flow into the air passage 101 of a conventional carburetor through passageways terminating in orifices opening to the interior of the air passage and preferably cause the fuel to be sprayed into the air stream for better intermixing. Alternatively, some carburetors are provided with fuel injection devices whch are adapted to spray a quantity of fuel into that air stream. In the conventional carburetion systems and apparatus, the throttle plate 103 is normally controlled by the vehicle operator. This is accomplished by means of mechanical linkages which interconnect an actuating arm on the throttle plate with the accelerator pedal. In adapting a carburetor of this type for use with the control system of this invention, the mechanical linkage between the accelerator pedal and the throttle plate is retained and this mechanism is thus diagrammatically illustrated in FIG. 13 as comprising a lever arm linkage 106 which interconnects between a throttle plate actuating arm and the accelerator pedal 76. While the throttle plate control linkage is retained, the fuel source is modified and the conventional fuel inlet system indicated generally at 105 is eliminated.

Modification of a conventional carburetion system to utilize the inventive control sytem includes addition of a housing extension 107 which is mechanically interconnected with the original equipment carburetor by a suitable mechanical connector 108. This housing extension 107 may comprise an elongated tube having its lower end connected in flow communicating relationship with the conventional carburetor inlet for the air to the housing passage 101 and its upper end then adapted to interconnect with a suitable air filter. Positioned in the housing extension 107 which also includes a central air passage 109 is a secondary throttle plate 110. This secondary throttle plate 110 is also provided with an actuating arm 110a that is adapted to be mechanically interconnected with an electro-mechanical actuating device 111 such as a solenoid. This actuating device 111 may advantageously comprise an electric solenoid which responds to an electrical signal provided by the air-fuel control circuit 12 to position the secondary throttle plate at a desired position for a particular operating condition. Fuel is supplied through the housing extension 107 via a fuel line connection 112 which is connected to the vehicle's fuel source. Included in this fuel line connection 112 is an electrically operated valve 113 which is also advantageously provided with an electro-mechanical actuating device such as a solenoid 114. The solenoid 114 is interconnected into the air-fuel control circuit 12 to derive a control single signal therefrom to operate the valve 113 in controlling the rate of fuel flow into the carburetor extension. This modification of a conventional carburetor to adapt that apparatus for use with the control system of this invention is an exemplary embodiment and has the advantage in that no major modifications are required to adapt the system to an existing vehicle engine. Providing of a secondary throttle plate is of advantage in that it enables the system to provide a further control to the air flow.

FIG. 14 is illustrative of an air-fuel dispensing device 18 which is initially designed for utilization with the system of this invention. That dispensing device also includes a housing 115 which includes a central air passageway 116. In this device, a single throttle plate 117 is provided and control thereof is solely effected through the control system of this invention. This throttle plate provides complete control of the air-fuel mixture to the engine, thereby eliminating any mechanical linkage between a throttle plate and the accelerator pedal 76. This modified system also includes a fuel inlet 118 that is provided with a control valve in the same manner as previously described and is thus identified by the same numbers. Both the throttle plate 117 and the fuel line valve 113 are controlled by means of the respective electric solenoids 111 and 114 which carry the same identifying numbers as in the illustrative embodiment of FIG. 13. Each of those solenoids is also interconnected to receive control input signals from the air-fuel control circuit 12. In this embodiment, if desired, the mechanical control for the choke plate 102 may be eliminated by providing a choke plate 119 which is responsive to an electrical control system 120. That electrical control system is not illustrated or described in greater detail, but is shown as engine sensors 121 and it would include inputs to provide an indication of engine operation such as engine temperature, air temperature and perhaps engine speed. These engine sensors may be electrical or mechanical or some combination thereof. The particular choke control that may be utilized is not of consequence with respect to this invention and it is not otherwise described or illustrated.

The electro-mechanical actuating devices 111 and 114 utilized in the illustrative embodiments of the air-fuel dispensing devices 18 are described as comprising electrical solenoids. Electrical solenoids are generally considered "ON-OFF" type devices, but such devices are commonly adpated to function wherein intermediate positioning of a controlled element is desired. One technique for achieving this operational objective is powering of the solenoid with a pulse-form signal to an "ON" position while continuously biasing the solenoid to an "OFF" position such as by a spring biasing element. As will be described in detail, the fuel-air control circuit 12 is designed to generate a pulse-form voltage signal at each output in accordance with the control parameters and signal inputs. Application of a voltage of sufficient magnitude over a predetermined time period will result in a respective solenoid 111 or 114 driving its connected control element to a full ON position which is a full open setting for the throttle plate 110 or 117 and the fuel control valve 113. However, if that voltage is not applied for that time period, the solenoid will only drive the connected control element to a partially ON position, that is, to an intermediate position. Consequently, with a pulse-form signal applied to the solenoid for less than the minimum time period, which time period can be defined as cycle, the biasing spring will then be operative to drive the controlled element in the opposite direction to the "OFF" position. This results in an oscillatory type operation with the solenoid being alternatingly energized and deenergized to cause the controlled element to be positioned in accordance with the pulse-form output signal from the fuel-air control circuit.

AIR-FUEL CONTROL CIRCUIT

Included in the air-fuel control circuit 12 is a time adjustment circuit 125 and a quantity adjustment circuit 126 which are interconnected to receive the signal pulses provided by the clock and command circuit 14 at its output point F. A power amplifier circuit 127 is also included for amplication of the control signal provided via the time and quantity adjustment circuits 125 and 126 to the extent necessary to provide respective signals for effecting operation of the electro-mechanical components of the air-fuel dispensing device 18. Each of the time and quantity adjustment circuits 125 and 126 is of a selectively adjustable type that is adjusted in accordance with the initial set up of the ignition and fuel control system with a particular engine. Functionally, these two adjustment circuits are equivalent to the idle adjustment and air-fuel mixture adjustment incorporated in a conventional carburetor apparatus.

The timing adjustment circuit 125 receives the signal pulses from the clock and command circuit 14 and counts those pulses in its functional operation to provide a proportionally related series of output voltage pulses. As such, the timing adjustment circuitry responds in counting of the pulses generated either by the timing detector circuit 10, the acceleration clock circuit 73 or the deceleration clock circuit 72 for a particular mode of operation of any particular instant such as, steady state, acceleration or deceleration, to generate a new pulseform clock signal, but which is related to the signal received at the output point F. It will be noted that while the acceleration and steady state clock signals will have a uniform periodic cycle, the deceleration clock signal will not. However, the deceleration clock circuit 72 produces a certain number of pulses in a specified time interval although with different time spacing between any two adjacent pulses and the time adjustment circuit responds to the number of pulses in a time interval without regard to their spacing. The output pulse rate generated by the time adjustment circuit 125 will be proportional to the requirements of the system and this voltage pulse clock signal is then applied to the respective control solenoids 111, 114 of the air-fuel dispensing device 18 via the quantity adjustment circuit 126 and power amplifier 127 in accordance with their respective functional operation. The clock signal that is thus received by the adjustment circuit 86 will be operable to effect an appropriate increase or decrease in air and fuel that is dispensed to the engine in accordance with the particular operating mode and engine operating state, such as speed.

In general, the steady state clock signal results in maintaining of the engine operation at the desired point determined in accordance with a specific selected position of the accelerator input control 17 and, in particular, related to the position of the controllable circuit element 74 and the engine speed. However, in response to receipt of either an acceleration clock signal or a deceleration clock signal, the quantity adjustment circuit 126 will not only modify its respective output signals in accordance with the input provided by the controllable circuit element 74, but will further modify those signals in accordance with either the rate at which deceleration occurs or with the acceleration clock signal which may be applied to output point F at any particular instant.

A more detailed circuit for the time adjustment circuit 125 is shown in FIG. 15 and comprises circuitry which effectively reduces the actual number of input signals to a number that is more appropriate to the mechanical functioning of the operating components that are controlled thereby. The clock and command circuit 14 of this system provides a clock signal at the terminal point F that is of a relatively high rate or high frequency. Thus, it is appropriate to reduce that input clock signal to a more reasonable clock rate. This can be accomplished by an exemplary circuit for the time adjustment circuit 125 such as that which is shown in FIG. 15 and is a linear operating circuit. This circuit includes an N-bit counter 128 which, in this embodiment, is an 8-bit type having eight outputs to provide a count at any number of points from 0–255. These outputs are respectively applied to a logic circuit which is indicated as comprising eight exclusive NOR (EXNOR) type gates 129 that provide a respective output to a single AND gate 130. Each of these EXNOR gates is also provided with a second input which derives a signal from a component illustrated as a manual switching device 131 comprising eight individually operable switches 132 providing an input to the EXNOR gates 129 which in a binary system is either logical 1 or 0. The switches 132 are merely ON-OFF switches that are selectively operated to apply or not apply a voltage to the respective connected gate. The combined outputs of each of the EXNOR gates 129 are applied to the AND gate 130 that is operative to produce the desired output signal as subsequently applied to the multivibrator circuits 132, 133 that are included in the quantity adjustment circuit 126. Setting the manual switches 132 to correspond with a situation wherein it is desired to provide an output for each 100 input counts (the setting illustrated in FIG. 15) will result in the EXNOR gates being enabled at a particular point coinciding with the one hundredth input signal count at terminal point F, and are then effective to provide their respective signals to the AND gate 130 and thus result in generation of a signal pulse at its output. Since a signal pulse is generated at the output of the AND gate 130 for each 100th input pulse received at the terminal point F, a new pulse train is generated at the gate's output with that pulse train having a pulse rate that is 1/100th of the input pulse rate to the N-bit counter 128. Different settings of the manual switches 132 will result in a different count being utilized to operate and provide the control pulse in generating a new clock signal having a pulse rate that is proportional to, but of a slower rate than that clock signal provided at terminal point F and which will be a linear function thereof. The counter 128 is also reset at each output from the AND gate 130 by a resetting pulse signal which is obtained from the AND gate.

The single clock signal generated at the output of the AND gate 130 in the time adjustment circuit 125 is utilized to control operation of the two multivibrator circuits 133, 134 included in the quantity adjustment circuit 126. Although each multivibrator circuit receives the same clock signal for its control, each multivibrator is independent in its operation and is designed to generate respective output pulse signals having a pulse-form that is related to its control function. The several related clock signals are graphically represented in FIG. 16 to better illustrate their functional relationships.

Referring to FIG. 15, it will be noted that each of the two multivibrator circuits 133, 134 is also respectively identified as for control of either the fuel or the air in the mixture controlling mechanisms of the air-fuel dispensing device 18. Each of the multivibrators includes an adjustable RC type of time control to effect a variation in the length of the output pulses that are produced by the respective circuit components. In this instance, the input is the pulse signal that is received from terminal point F through the time adjustment circuit 125, and thus, for a particular point of operation, comprise respective sequences of pulses as is shown in FIGS. 16A and 16B. The time adjustment circuit 125 is designed to reduce the number of pulses applied to the quantity adjustment circuit 126 in accordance with a predetermined control function. Each of these pulses, in turn, drives the respective multivibrator 133, 134 to produce a respective output signal of pulse-form and which are respectively identified in the FIGS. 16C and 16D. It will be noted that each of these output pulses from the respective multivibrator are of a different time length and thus achieve the objective of obtaining two different signals from a single input. This difference in length is obtained in the exemplary embodiment for purposes of explanation through the adjustable RC timing delay circuits. Setting the resistance $R_A$, $R_F$ to a particular value in each circuit will this result in the operation to effect a certain length output pulse. In a system which can be responsive to a linear control, and this is a reasonable operation for the fuel-air mixture, it will be seen that each of the multivibrators can thus be set to operate and provide its respective output pulse. Although only a single input signal is provided to the composite system, separate and distinct control signals are provided to the operating components, the solenoids 111, 114 for the respective fuel control valve 113 and the air flow valve or throttle plate 110, which are each responsive to the time duration of those pulses and result in an analog positioning of the respectively controlled element to provide the proportionate air and fuel flow to obtain a particular fuel air mixture.

Changing of the rate of the input pulse signal at the terminal F will result in a proportionate change in the number of pulses at the output of each multivibrator. Thus, any change in the input control signal pulses which is determined by the other components of the system will result in a change to effect a proportionate linear change in the fuel and air control functions.

The preceding description relates to a linear operating airfuel control circuit 12, but it may be advantageous to use a non-linear operation to enable the system to better adapt to particular engines and operating conditions. Non-linear operation can be achieved through incorporation of memory circuits in the time adjustment circuit and an exemplary embodiment of such a time adjustment circuit 135 is shown in FIG. 17. Through use of memory circuits, it is possible to incorporate desired control functions to accommodate other factors in controlling functioning of the air-fuel dispensing device 18 through its acutating solenoids 111 and 114.

Referring to FIG. 17, it will be seen that the exemplary time adjustment circuit 135 includes in its input section, an N-bit counter 136 which is again shown as an 8-bit type, a logic circuit comprising eight AND gates 137 and a clock circuit 138. Each of the AND gates has one input connected to a respective one of the eight outputs of the N-bit counter 136 and has a second input connected in common with the output of the clock circuit 138. The clock circuit 138 is a fixed frequency type and provides a pulse signal at a predetermined, constant rate with a pulse signal thus being applied to each of the AND gates 137 at fixed time intervals. The clock signal input from terminal point F and applied to the N-bit counter 136 will vary in accordance with the operating mode and engine speed and there will be one or more AND gates receiving an input from the counter at a particular instant and be enabled to generate an output pulse signal at the time when the fixed frequency clock 138 provides a signal. Consequently, the logic circuit gates 137 will collectively function to generate a signal that is related to the input clock signal at terminal F. At each time point when the counter 136 is being read by operation of the gates 137, the clock 138 provides a lock-out signal to prevent further counting by the counter and, at a predetermined later time, provides a reset signal. The reset signal is applied to the counter 136 via a time delay circuit 139.

The output of the gate or gates 137 that are enabled is applied to the respective inputs of two memory circuits 140 and 141. One memory circuit 140 is designed for air control while the other circuit is designed for fuel control. These memory circuits are of a read-only type (ROM) and are of a design capacity deemed adequate to provide sufficiently small incremental change in output for smooth control over a non-linear function. The illustrative embodiments of the ROMs have an eight bit input and a 256 bit output. Operation of the ROMs is such that a specific input address (same for both air and fuel) will result in an output at the terminals $R_x$ corresponding to the stored data at that address in memory which can and most probably will be different data for each of the air and fuel ROMs. This output from each ROM 140, 141 is applied to a respective N-bit latch circuit 142, 143 which functions to retain the received input signal from the ROM. Each of the latch circuits retains the received ROM output for the time interval that is determined by the clock 138 and thus provides a constant output signal for that time period between each signal pulse of the clock. The outputs of the latch circuits 142, 143 are connected to respective logic circuits that each include sets of eight EXNOR gates 144, 145. One input of each gate 144, 145 is connected to a respective output of the related latch circuit 142, 143 with the other input being connected to a respective output of a related N-bit counter circuit 146, 147. Each of the counter circuits is connected to receive the clock signal input at terminal F and provides an output signal that is related to the clock signal that is generated by the ADS circuit 70. At particular but different points in time, the counters 146, 147 will register outputs that are the same as the latch outputs and, at that point, the EXNOR gates 144, 145 will generate outputs that are applied to respective AND gates 148, 149 resulting in generation of respective output pulses that form the inputs to the quantity adjustment circuits such as is described in conjunction with the linear circuit of FIG. 15. Generation of the output signal pulse by the AND gates 148, 149 also results in resetting of the respective counter 146, 147 and providing an operating input for latch circuit 142, 143. This operating input to the latch 142, 143 is provided via an AND gate 150, 151 which has one input connected to receive the output of the AND gates 148, 149 by means of a control latch circuit 152, 153. The other input to the AND gates 150, 151 is provided by the clock 138 and the N-bit latch circuits 142, 143 will function to read the ROMs when a clock pulse is provided.

In this non-linear system, the pulse signals formed for the air and fuel control are not related to each other in any direct manner and are varied in accordance with the respective pre-programmed ROM. The air and fuel signals are independently applied to a respective multivibrator in a quantity adjustment circuit (not shown) which functions to further modify the signal in a manner as described in conjunction with FIG. 16.

SYSTEM OPERATION

Having described in detail the various sections and components of the ignition and fuel control system of this invention, it is believed that the function and advantages of the system will be better understood with reference to a described illustrative operating sequence. Accordingly, it will be assumed that the engine is not operating at the outset and that the entire function will be described from a start-up of that engine. Upon initial start-up, the electrical power system of the vehicle would be utilized by means of the ignition switch 24 through positioning of its moveable contact to effect starting of the engine. This is accomplished by placing the contact at the third position whereby battery power will be supplied to the starting motor 26. Concurrently, the second contact of switch 24 will engage a terminal so as to supply electrical power to both the voltage reduction circuit 23 and the circuitry associated with the ignition coils. The five volt direct current power is thus also simultaneously applied to the control system of this invention as is required for its operation.

As the starting motor 26 causes the engine to turn, it will result in rotation of the rotor shaft 37 of the timing control device 35. This rotation is sensed by the respective first and second sensing circuits 30 and 31 as a consequence of the optical system which includes the respective sensing elements 33 and 34. However, there will be no firing of the ignition devices 50 unless, or until such time as the first sensing circuit 30 has detected passage of the sensing element 40 or 40a carried on the master rotor lobe and is associated with the first cylinder to be fired in the firing order sequence. It will be noted that it does not matter which of the pairs of reflective elements, either 39 or 39A, or 40 or 40A also carried by that same rotor lobe, is first detected. Consequently, both of the sensing circuits 30 and 31 will function to provide an output signal at their respective output points A, B and C. It will be noted here that the power-up and start circuit 15 has, up to this point, prevented initiation of any firing of the ignition devices 50 since the sensing of any of the elements 39 prior to the concurrent sensing of the reflective element 40 by the first circuit will be ineffective to provide any signal to any other portion of the circuit. At this first concurrent providing of such signals, the first sensing circuit will provide a signal to the pulse count circuit 60 which will result in effecting its resetting to an initial count configuration. Concurrently, a signal is provided by the first sensing circuit 30 through its output point B to the power-up and start circuit 46. A concurrent signal is provided by the second sensing circuit 31 through its output point C to the check point circuit 47 and the combination thus provides a signal at the output point D.

With the signals thus provided at the output point D and at point A, the operating state check circuit 16 will function to provide a correct signal to the pulse count circuit 60 and to the firing select circuit 61. With the application of the enable signal by circuit 16, the distributor circuit 13 will then be enabled to initiate its operation. As previously described, the simultaneous providing of those signals results in the distributor circuit then proceeding to provide a firing control signal that is applied to the several gating circuits 54 in accordance with the predetermined firing order sequence. The application of a firing control signal to the respective gating circuits is controlled in timed relationship to the continued sensing of the reflecting elements in a sequential manner on the other lobes of the timing rotor.

At this time, a signal is also provided to the ADS circuit 70 and deceleration clock circuit 72 as a consequence of their interconnection to the output point Y and a pulse-form clock signal is thus received from the timing circuit 10. Depending upon the particular physical positioning of the controllable element 74 of the accelerator input control 17, the clock and command circuit 14 will be effective to provide a clock signal at its output points F and G in accordance with the sensed operating condition. The clock signal provided by the ADS circuit at its output point G to the respective gating circuit 59 will be in timed relationship to the pulse or clock signal that is received from the output point Y regardless of whether there is a sensed operating mode of deceleration or steady state operation, or it will be a high rate clock from the acceleration clock 73 resulting in multiple firing for each firing signal provided by the distributor circuit.

Assuming that the start-up operation has been successful, the engine will then continue to operate in accordance with the parameters as determined by loading of the engine and by the control function exercised by operation of the accelerator input control 17. Considering that the engine will be at idle speed immediately after the start-up operation, the accelerator control element 74 would be at a position where an idle input signal would be supplied to the A/D converter 78. The idle condition is a steady state operating mode and thus the system would continue to function through the application of the clock signals derived at the output point Y from the timing detector circuit 10 via the power-up and start circuit 15 and the operating state check circuit 16.

Assuming that it is desired to then accelerate the engine, the accelerator input control 17 would be operated to displace its moveable control element 74 to a selected position and thereby provide an analog voltage signal that is different from that of the idle speed condition previously sensed. The effect of this providing of a different analog signal is that its conversion to a digital signal and applied to the mode check point circuit 71 will result in selection of the acceleration input to the ADS circuit 70. In this acceleration mode, the acceleration clock circuit 73 will be effective in providing a clock signal to both of the output points F and G of the ADS for the purpose of multiple pulse firing by ignition power circuit 11 and operation of the air fuel control circuit 12 in accordance with the relatively high rate acceleration clock signal. This change in operating mode results in a fuel-air system operation with a consequent increase in the fuel in the combustion chamber in a directly proportional relationship to the rate of firing and will be exactly that fuel needed at that particular time. Once the acceleration of the engine and the vehicle, if there is a drive connection, is completed, the system will then revert to a steady state operation in accordance with the point of operation as determined by the retaining of the controllable element 74 of the accelerator input control in a fixed position. A subsequent acceleration will result in resumption of the same type of operation until the next selected operating point is attained.

A deceleration operation, assuming that the engine had been placed in a position other than idle, will result in the application of a deceleration clock signal and the deceleration clock circuit 72 will then be effective to provide a deceleration clock signal to the air fuel control circuit 12 via the ADS output point F. As previously described, the steady state clock signal associated with the instantaneous operation of the engine as sensed by the timing detector citcuit 10 will form the clock signal that is applied to the ignition power circuit via the output point G of the command circuit 14.

It is believed that this description of typical operations of the system of this invention will clearly indicate the novel and advantageous features thereof. The system is entirely electronic in its operation in controlling both the ignition and fuel systems and provides both the advantageous multiple firing pulses for ignition in the acceleration operating mode as well as an increased clock signal rate in the operation of the fuel control. The electronic distributor, as provided herein, enables the system to be readily adapted and incorporated in an engine having a different number of cylinders without requiring any extensive modification of the systems. Merely providing of an appropriate distributor type timing control device results in the system being enabled to operate with the number of cylinders associated with that particular device. The fuel control, being a regulated fuel control through the clock signals, results in enhanced engine performance and fuel efficiency.

Having thus described this invention, what is claimed is:

1. An ignition and fuel control system for internal combustion engines having a combustion chamber for a fuel-air mixture and an ignitor device for the combustion chamber selectively operable to effect ignition of a fuel-air mixture introduced therein, said system comprising A. ignition circuit means for effecting operation of an ignitor device of a combustion chamber, including
    (1) electrical ignition pulse generating means having an output connectable in electrical power transmitting relationship with an ignitor device, and
    (2) switching circuit means connected in electric power controlling relationship to said ignition pulse generating means and provided with an electrical power input connectable to a suitable source of electrical power, said switching circuit means selectively operable in response to concurrent receipt of a firing control clock signal at a first signal input and a clock signal at a second signal input to enable transfer of electrical power to said ignition pulse generating means for generation of an ignition pulse,
  B. air-fuel dispensing means including
    (1) an air-fuel dispensing device having air flow controlling means and fuel flow controlling means and having selectively operable actuation means operatively coupled with at least said fuel flow controlling means and operably responsive to a control signal, and
(2) an air-fuel control circuit having
a. an input for receiving a clock signal provided thereto, and
b. circuit means operably responsive to a clock signal received at said input to provide a control signal functionally related to said received clock signal at an output thereof, said output connected in electric circuit relationship with said actuation means for said air-fuel dispensing device,
C. timing detector circuit means including
(1) sensing means adapted for disposition in operatively coupled relationship to an engine for sensing the functional operation thereof and to generate a timing signal related to such functional operation, and
(2) firing control circuit means connected with said sensing means and responsive to a timing signal generated thereby for generating a firing control clock signal, said firing control circuit means connected with the switching circuit means of said ignition circuit means to provide the firing control clock signal thereto, and
D. clock and command control circuit means including
(1) an accelerator input control selectively operable to generate an electrical command signal,
(2) an acceleration clock circuit operable to generate a clock signal of a predetermined rate, and
(3) command control circuit means interconnected with said timing detector circuit, acceleration input control and acceleration clock circuit to receive each respective signal thereof and having respective outputs interconnected with the switching circuit means of said ignition circuit means and with said air-fuel control circuit, said command control circuit means responsive to said command signal to provide a clock signal at each of its outputs in accordance with the instant operating mode of the engine, said command control circuit means including a clock control circuit, a deceleration clock circuit operable to generate a deceleration clock signal in response to the command signal generated by said accelerator input control and to the signal generated by said timing detector circuit means and a mode check point circuit, said mode check point circuit responsive to a generated command signal to determine existence of a steady state operation or acceleration or deceleration relative to an immediately preceding operating condition and to provide a respective output signal to said clock control circuit, said clock control circuit operative in response to a deceleration mode signal to provide said deceleration clock signal to said air-fuel control circuit.

2. An ignition and fuel control system for internal combustion engines having a combustion chamber for a fuel-air mixture and an ignitor device for the combustion chamber selectively operable to effect ignition of a fuel-air mixture introduced therein, said system comprising A. ignition circuit means for effecting operation of an ignitor device of a combustion chamber, including
(1) electrical ignition pulse generating means having an output connectable in electrical power transmitting relationship with an ignitor device, and
(2) switching circuit means connected in electric power controlling relationship to said ignition pulse generating means and provided with an electrical power input connectable to a suitable source of electrical power, said switching circuit means selectively operable in response to concurrent receipt of a firing control clock signal at a first signal input and a clock signal at a second signal input to enable transfer of electrical power to said ignition pulse generating means for generation of an ignition pulse,
B. air-fuel dispensing means including
(1) an air-fuel dispensing device having air flow controlling means and fuel flow controlling means and having selectively operable actuation means operatively coupled with at least said fuel flow controlling means and operably responsive to a control signal, and an air-fuel control circuit having
a. an input for receiving a clock signal provided thereto, and
b. circuit means operably responsive to a clock signal received at said input to provide a control signal functionally related to said received clock signal at an output thereof, said output connected in electric circuit relationship with said actuation means for said air-fuel dispensing device,
C. timing detector circuit means including
(1) sensing means adapted for disposition in operatively coupled relationship to an engine for sensing the functional operation thereof and to generate a timing signal related to such functional operation, and
(2) firing control circuit means connected with said sensing means and responsive to a timing signal generated thereby for generating a firing control clock signal, said firing control circuit means connected with the switching circuit means of said ignition circuit means to provide the firing control clock signal thereto, and
D. clock and command control circuit means including
(1) an accelerator input control selectively operable to generate an electrical command signal,
(2) an acceleration clock circuit operable to generate a clock signal of a predetermined rate, and
(3) command control circuit means interconnected with said timing detector circuit, acceleration input control and acceleration clock circuit to receive each respective signal thereof and having respective outputs interconnected with the switching circuit means of said ignition circuit means and with said air-fuel control circuit, said command control circuit means responsive to said command signal to provide a clock signal at each of its outputs in accordance with the instant operating mode of the engine, said command control circuit means including a clock control circuit, a deceleration clock circuit having an input connected with said timing detector circuit to receive the firing control clock signal generated thereby and an input connected with said accelerator input control and being operatively responsive to each of said signals input thereto to generate a deceleration clock signal at an output thereof and mode check point circuit, said mode check point circuit connected with said accelerator input control to respond to the signal generated thereby and operable to determine acceleration or deceleration relative to an immediately preceding operating condition or to determine existence of a steady state operation and provide a respective output signal to said clock control circuit whereby said clock control circuit will be controlled to provide a clock signal either from said timing detector circuit or from said deceleration clock circuit or from said acceleration clock circuit, said clock control circuit connected to said deceleration clock circuit output and operative to provide said deceleration clock signal at an output thereof connected with said air-fuel control circuit when said mode check point circuit provides a deceleration signal to said clock control circuit.

3. An ignition and fuel control system for internal combustion engines having a combustion chamber for a fuel-air mixture and an ignitor device for the combustion chamber selectively operable to effect ignition of a fuel-air mixture introduced therein, said system comprising A. ignition circuit means for effecting operation of an ignitor device of a combustion chamber, including
  (1) electrical ignition pulse generating means having an output connectable in electrical power transmitting relationship with an ignitor device, and
  (2) switching circuit means connected in electric power controlling relationship to said ignition pulse generating means and provided with an electrical power input connectable to a suitable source of electrical power, said switching circuit means selectively operable in response to concurrent receipt of a firing control clock signal at a first signal input and a clock signal at a second signal input to enable transfer of electrical power to said ignition pulse generating means for generation of an ignition pulse, B. air-fuel dispensing means including
  (1) an air-fuel dispensing device having air flow controlling means and fuel flow controlling means and having selectively operable actuation means operatively coupled with at least said fuel flow controlling means and operably responsive to a control signal, and
  (2) an air-fuel control circuit having
    a. an input for receiving a clock signal provided thereto, and
    b. circuit means operably responsive to a clock signal received at said input to provide a control signal functionally related to said received clock signal at an output thereof, said output connected in electric circuit relationship with said actuation means for said air-fuel dispensing device, C. timing detector circuit means including
  (1) sensing means adapted for disposition in operatively coupled relationship to an engine for sensing the functional operation thereof and to generate a timing signal related to such functional operation, and
  (2) firing control circuit means connected with said sensing means and responsive to a timing signal generated thereby for generating a firing control clock signal, said firing control circuit means connected with the switching circuit means of said ignition circuit means to provide the firing control clock signal thereto, D. clock and command control circuit means including
  (1) an accelerator input control selectively operable to generate an electrical command signal,
  (2) an acceleration clock circuit operable to generate a clock signal of a predetermined rate, and
  (3) command control circuit means interconnected with said timing detector circuit, acceleration input control and acceleration clock circuit to receive each respective signal thereof and having respective outputs interconnected with the switching circuit means of said ignition circuit means and with said air-fuel control circuit, said command control circuit means responsive to said command signal to provide a clock signal at each of its outputs in accordance with the instant operating mode of the engine, and E. an operating state check circuit means interconnected between said timing detector circuit and each of said clock and command control circuit means and said ignition circuit means for responding to signals generated by said timing detector circuit and determining whether such signals are in a proper state and converting signals determined to be in an improper state to a proper state.

4. A system according to claim 2 wherein said deceleration clock circuit is operable to form a deceleration clock signal having a predetermined rate that is less than the rate of the timing detector circuit signal.

5. A system according to claim 2 wherein said command control circuit means includes a deceleration rate control circuit interconnected in circuit between said accelerator input control and said deceleration clock circuit, said deceleration rate control circuit operably responsive to the command signal to provide a rate control signal that is related to the deceleration and providing such rate control signal to said deceleration clock circuit, said deceleration clock circuit responsive to said rate control circuit to form a deceleration clock signal having a rate that is less than the rate of the firing control clock signal provided by said timing detector circuit.

6. A system according to claim 5 wherein said deceleration clock circuit rate is less than the rate of the firing control clock signal provided by said timing detector circuit in proportional relationship to the deceleration rate.

7. A system according to claim 5 wherein said command control circuit means includes an analog-to-digital converter having an input connected to said accelerator input control and an output connected to each of said mode check point circuit and said deceleration rate control circuit, said accelerator input control generating an analog command signal and said analog-to-digital converter providing a digital signal at its output that is related to said analog command signal.

8. A system according to claim 2 wherein said command control circuit means is operative to provide the acceleration clock circuit signal to said ignition switching circuit means only when said mode check point circuit determines that the engine is in an acceleration mode of operation and to provide the firing control clock signal provided by said timing detector circuit to said ignition switching circuit means at all other times.

9. A system according to claim 2 wherein said command control circuit means is operable to provide to said air-fuel control circuit
   a. the firing control clock signal provided by said timing detector circuit when the system is in a steady state operating mode,
   b. the acceleration clock circuit signal when in an acceleration operating mode and
   c. the deceleration clock circuit signal when in a deceleration operating mode.

10. A system according to claim 1 wherein the switching circuit means of said ignition circuit means includes a gating circuit having first and second inputs connected to respectively receive said firing control clock signal and said command and control circuit means, clock signal and an output connected to provide a firing signal to said ignition pulse generating means, said gating circuit operable to provide said firing signal of its output upon concurrent receipt of the respective signal at each of said first and second inputs.

11. A system according to claim 10 wherein said switching circuit means has an electronic switching circuit interposed between the gating circuit output and said ignition pulse generating means, said electronic switching circuit having an electrical power input connectable to a power source and a control signal input connected to the output of said gating circuit, said electronic switching circuit responsive to a signal input at its control signal input to complete an electrical circuit from its electrical power input to its output for transmission of electrical power therethrough to said ignition pulse generating means.

12. A system according to claim 1 wherein said ignition pulse generating means includes a respective ignition coil for each ignitor device, each ignition coil having a primary winding connected with said switching circuit means and a secondary winding having a terminal connectable with the ignitor device.

13. A system according to claim 1 for an internal combustion engine having a plurality of combustion chambers and an ignitor device for each of said combustion chambers which are to be fired in a predetermined firing order sequence and wherein said ignition circuit means includes respective ignition pulse generating means and switching circuit means for each combustion chamber and ignitor device, the sensing means of said timing detector circuit means includes first and second sensing circuits operable to generate respective first and second firing control clock signals relative to the functional operation of the engine with said first sensing circuit operable to sense the first combustion chamber to be fired in the firing order sequence in providing a respective signal and said second sensing circuit operable to sense each of the combustion chambers in providing respective signals for each of said combustion chambers, said command control circuit means connected to each of said switching circuit means to apply a signal thereto, and the circuit means of said timing detector circuit means including a distributor circuit having first and second inputs connected to receive the respective first and second timing signals and provide a firing control signal to each switching circuit means of said ignition circuit means in the predetermined firing order sequence.

14. A system according to claim 13 wherein said distributor circuit includes a firing select circuit having a first input connected to said timing detector circuit means to receive said second timing signals, a plurality of outputs with each output connected to a respective one of said ignition switching circuit means, and a select signal input, said firing select circuit operable in response to input of select signals thereto to sequentially provide a firing control signal at the outputs thereof in timed relationship to said second timing signals.

15. A system according to claim 14 wherein said distributor circuit includes a pulse count circuit having a first input connected to receive said first timing signals from said timing detector circuit means, a second input connected to receive said second timing signals from said timing detector circuit and an output connected to the select signal input of said firing select circuit for providing of select signals thereto, said pulse count circuit operable in response to receipt of a first timing signal to reset for a next successive counting sequence.

16. A system according to claim 13 which includes a power-up and start circuit having a first input connected to said timing detector circuit to receive the first timing signal therefrom, a second input connected to said timing detector circuit to receive the second timing signals therefrom, and an output connected to provide said firing control clock signal to said distributor circuit and to said clock and command circuit, said power-up and start circuit operable to provide said firing control clock signal at its output only when it has received said first timing signal for a firing order sequence.

17. A system according to claim 16 wherein said power-up and start circuit includes a gating circuit having first and second inputs and an output at which said firing control clock signal is provided, said first and second gating circuit inputs connected to receive first and second timing signals, respectively, generated by said timing detector circuit.

18. A system according to claim 17 wherein said power-up and start circuit includes circuit means interconnected in circuit with the first input to said gating circuit for preventing providing of a signal thereto until said detector circuit first provides a first timing signal upon start-up of the system.

19. A system according to claim 1 which includes an operating state check circuit means interconnected between said timing detector circuit and each of said clock and command control circuit means and said ignition circuit means for responding to signals generated by said timing detector circuit and determining whether such signals are in a proper state and converting signals determined to be in an improper state to a proper state.

20. A system according to claim 1 wherein said fuel flow controlling means is responsive to a control signal provided by said airfuel control circuit.

21. A system according to claim 1 or 20 wherein said air flow controlling means is responsive to a control signal provided by said airfuel control circuit.

22. A system according to claim 1 wherein each of said air and fuel flow controlling means are responsive to respective signals generated by said air-fuel control circuit with each of said respective signals proportionally related to a clock signal received by the circuit means of said air-fuel control circuit and to a respective control parameter.

23. A system according to claim 22 wherein the circuit means of said air-fuel control circuit includes memory circuit means for each of the air and fuel control.

* * * * *